(12) United States Patent
Roberts et al.

(10) Patent No.: US 10,023,323 B1
(45) Date of Patent: Jul. 17, 2018

(54) ESTIMATING WIND FROM AN AIRBORNE VEHICLE

(71) Applicant: X Development LLC, Mountain View, CA (US)

(72) Inventors: Richard Joseeph William Roberts, Mountain View, CA (US); Joshua John Bialkowski, San Mateo, CA (US); Justin Sadowski, San Francisco, CA (US); John Roberts, Mountain View, CA (US)

(73) Assignee: X Development LLC, Mountain View, CA (US)

(*) Notice: Subject to any disclaimer, the term of this patent is extended or adjusted under 35 U.S.C. 154(b) by 142 days.

(21) Appl. No.: 14/699,058

(22) Filed: Apr. 29, 2015

(51) Int. Cl.
   *B64D 43/00* (2006.01)
   *B64C 39/02* (2006.01)

(52) U.S. Cl.
   CPC ............ *B64D 43/00* (2013.01); *B64C 39/024* (2013.01); *B64C 2201/141* (2013.01)

(58) Field of Classification Search
   CPC .. B64D 43/00; B64C 39/024; B64C 2201/141
   See application file for complete search history.

(56) References Cited

U.S. PATENT DOCUMENTS

| | | | | |
|---|---|---|---|---|
| 5,216,611 A | * | 6/1993 | McElreath | G01C 21/165 342/357.32 |
| 6,807,468 B2 | * | 10/2004 | Campbell | G01C 21/165 701/14 |
| 8,219,267 B2 | * | 7/2012 | Hamke | G01P 5/00 701/14 |
| 9,488,978 B2 | * | 11/2016 | Callou | G05D 1/0204 |
| 2012/0120230 A1 | | 5/2012 | Wilkerson et al. | |
| 2014/0129057 A1 | * | 5/2014 | Hall | G05D 1/0202 701/7 |

OTHER PUBLICATIONS

Mario Zanon, Sebastien Gros, and Moritz Diehl, "Model Predictive Control of Rigid-Airfoil Airborne Wind Energy Systems," Chapter 12 in "Airborne Wind Energy," Soringer-Verlag 2013.

* cited by examiner

*Primary Examiner* — Brian M O'Hara
*Assistant Examiner* — Keith L Dixon
(74) *Attorney, Agent, or Firm* — McDonnell Boehnen Hulbert & Berghoff LLP

(57) ABSTRACT

Embodiments are described for determining wind by an airborne aerial vehicle without reliance on direct measurements of airspeed by the vehicle. Instead, wind may be computationally estimated using disclosed techniques for utilizing measurements of only ground-speed and heading, or only measurements of forces experienced by the airborne aerial vehicle during flight. In one technique, samples of ground-speed measurements and corresponding heading measurements of an airborne vehicle are used in a mathematical optimization of a wind-driven hypothesis of deviations between the two types of measurement at each of multiple sampling times. In another technique, an aerodynamic model of an aerial vehicle can be used to adjust parameters of a wind hypothesis in order to achieve a best-fit between predicted and measured forces on the aerial vehicle during flight.

12 Claims, 9 Drawing Sheets

ESTIMATING WIND FROM AN AIRBORNE VEHICLE

BACKGROUND

Unless otherwise indicated herein, the materials described in this section are not prior art to the claims in this application and are not admitted to be prior art by inclusion in this section.

An unmanned vehicle, which may also be referred to as an autonomous vehicle, is a vehicle capable of travel without a physically-present human operator. An unmanned vehicle may operate in a remote-control mode, in an autonomous mode, or in a partially autonomous mode.

When an unmanned vehicle operates in a remote-control mode, a pilot or driver that is at a remote location can control the unmanned vehicle via commands that are sent to the unmanned vehicle via a wireless link. When the unmanned vehicle operates in autonomous mode, the unmanned vehicle typically moves based on pre-programmed navigation waypoints, dynamic automation systems, or a combination of these. Further, some unmanned vehicles can operate in both a remote-control mode and an autonomous mode, and in some instances may do so simultaneously. For instance, a remote pilot or driver may wish to leave navigation to an autonomous system while manually performing another task, such as operating a mechanical system for picking up objects, as an example.

Various types of unmanned vehicles exist for various different environments. For instance, unmanned vehicles exist for operation in the air, on the ground, underwater, and in space. Unmanned vehicles also exist for hybrid operations in which multi-environment operation is possible. Examples of hybrid unmanned vehicles include an amphibious craft that is capable of operation on land as well as on water or a floatplane that is capable of landing on water as well as on land. Other examples are also possible.

SUMMARY

In one aspect, example embodiments presented herein provide a method comprising: while flying along a flight path, an airborne unmanned aerial vehicle (UAV) determining from onboard sensor measurements a first time series of ground-speed vectors with respect to a ground-based coordinate system, the first time series having a set of time steps; while flying along the flight path, the airborne UAV determining from onboard sensor measurements a second time series of flight-heading vectors with respect to the ground-based coordinate system, the second time series having the same set of time steps as the first time series; and by a processor of the airborne UAV, computationally estimating a wind vector with respect to the ground-based coordinate system by optimizing an analytical model of wind-driven deviations between the ground-speed vectors and the flight-heading vectors at like time steps, the optimization being carried out over all data elements of the first and second time series.

In another aspect, example embodiments presented herein provide an unmanned aerial vehicle (UAV) comprising: a network interface; one or more sensors; one or more processors; and a computer-readable medium having stored therein instructions that are executable by the one or more processors to cause the UAV to carry out operations including: while flying along a flight path, determining from onboard sensor measurements a first time series of ground-speed vectors with respect to a ground-based coordinate system, wherein the first time series has a set of time steps, while flying along the flight path, determining from onboard sensor measurements a second time series of flight-heading vectors with respect to the ground-based coordinate system, wherein the second time series has the same set of time steps as the first time series, and computationally estimating a wind vector with respect to the ground-based coordinate system by optimizing an analytical model of wind-driven deviations between the ground-speed vectors and the flight-heading vectors at like time steps, wherein the optimization is carried out over all data elements of the first and second time series.

In a further aspect, example embodiments presented herein provide an unmanned aerial vehicle (UAV) comprising: a network interface; one or more sensors; one or more processors; and a computer-readable medium having stored therein instructions that are executable by the one or more processors to cause the UAV to carry out operations including: while flying along a flight path, determining from onboard sensor measurements a first time series of observed acceleration vectors, wherein the first time series has a set of time steps, computing a second time series of predicted acceleration vectors based on a wind hypothesis applied to an analytical aerodynamic model of the UAV, wherein the second time series has the same set of time steps as the first time series, and computationally estimating a wind vector with respect to a ground-based coordinate system by iteratively adjusting parameters of the wind hypothesis applied to the analytical aerodynamic model of the UAV so as to achieve optimal agreement between the predicted acceleration vectors and the observed acceleration vectors.

These as well as other aspects, advantages, and alternatives, will become apparent to those of ordinary skill in the art by reading the following detailed description, with reference where appropriate to the accompanying drawings.

DETAILED DESCRIPTION

Figure 1:
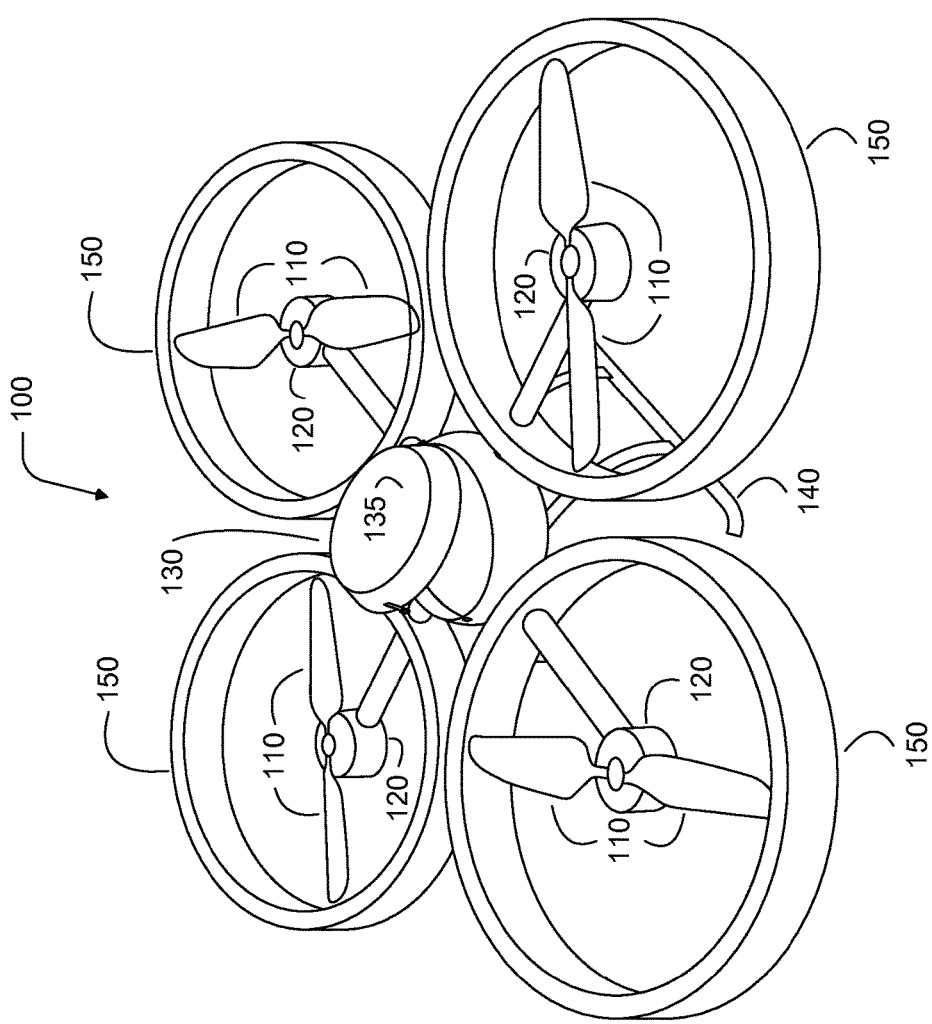
FIGS. 1, 2, 3A, and 3B are simplified illustrations of unmanned aerial vehicles, according to example embodiments.

Exemplary methods and systems are described herein. It should be understood that the word "exemplary" is used herein to mean "serving as an example, instance, or illustration." Any embodiment or feature described herein as "exemplary" or "illustrative" is not necessarily to be construed as preferred or advantageous over other embodiments or features. More generally, the embodiments described herein are not meant to be limiting. It will be readily understood that certain aspects of the disclosed systems and methods can be arranged and combined in a wide variety of different configurations, all of which are contemplated herein.

I. Overview

Example embodiments are disclosed herein for estimating wind by an airborne vehicle during flight using only sensors on the airborne vehicle, but not including airflow sensors. In particular, techniques are disclosed for using sensor measurements of physical properties such as ground speed, acceleration, and heading in an analytical framework for computing a wind vector during flight of the airborne vehicle. The ability of the airborne vehicle to compute a wind vector in this manner can be particularly useful for certain types of aerial vehicles, such as unmanned aerial vehicles (UAVs), for which airflow sensors are sometimes omitted for practical and/or design considerations.

Estimating wind can be important because in order for an airborne vehicle to move in a desired way, the effect of the wind on the vehicle generally needs to be compensated and/or accounted for. Furthermore, because winds aloft, where an airborne vehicle is flying, can differ significantly from winds on the ground, the airborne vehicle needs to be able to determine the wind at its own location during flight. In addition to estimating the wind for purposes of applying appropriate compensatory actions during airborne vehicle movements (e.g., aerial maneuvers), an airborne vehicle may also need to determine when a current wind vector might prevent the airborne vehicle from successfully executing a particular movement or maneuver. In such cases, the particular movement or maneuver might need to be avoided.

For a vehicle in flight, a dynamic relation between air speed, ground speed, and wind exists from which wind may be calculated. Ground speed can be derived directly from measurements of one or another type of onboard sensor, such as a global position satellite (GPS) system receiver. However, in the absence of an airflow sensor, such as a pitot tube, air speed cannot be directly measured, and therefore wind cannot be directly calculated from the dynamic relation. Nevertheless, techniques exist for estimating wind given an airborne vehicle's ground speed and heading. In this case, heading may be derived from measurements of an inertial measurement unit (IMU), possibly in combination with GPS or other sensor measurements.

In some circumstances, or for some configurations of aerial vehicles, existing techniques that rely on ground speed measurements and heading measurements can fall short for practical reasons relating to susceptibility to measurement noise and/or computational complexity. For example, one existing technique uses individually computed differences between pairs of measurements of ground speed and individually computed differences between pairs of measurements of heading. Each individually computed difference can introduce measurement noise, and thereby reduce the accuracy of the results. Another example existing technique involves analytically inverting a complex aerodynamic model. Such inversions can consume significant processor resources and power, and possibly push or exceed acceptable time limits for real-time wind determination by a UAV or other type of aerial vehicle lacking airflow sensors.

Accordingly, example embodiments described herein provide techniques for analytically estimating wind by an airborne vehicle in the absence of airflow measurements, and in a manner that alleviates the shortcomings of existing techniques. In one example technique, a large number of samples of ground-track measurements and corresponding heading measurements are used in a mathematical optimization of a wind-driven hypothesis of deviations between the two types of measurement at each sampling time.

In accordance with example embodiments, ground-track measurements can be made by an airborne vehicle at each of a sequence of time steps, providing a time series of ground-track vectors. Similarly, heading measurements can be made by the airborne vehicle at each of the same sequence of time steps, providing a time series of heading vectors. An analytical formulation relating deviations between the ground-track vectors and heading vectors at each time step and a wind vector hypothesized as the cause of the deviations can then be posed as an optimization problem. Carrying out the optimization yields the wind vector. Optimizing over the entire sample set of both time series can help reduce the effects of measurement noise, and thereby increase the accuracy of the wind estimate. In further accordance with example embodiments, this technique can be implemented as a computer-based numerical computation that can be practically applied in real-time to a large number of real-time measurements—many hundreds or more of samples—using processing capabilities typical of a UAV or other similarly constrained aerial vehicle.

In another example technique, an aerodynamic model of an aerial vehicle can be used to adjust model wind parameters in order to achieve a best-fit (e.g., in a least-squares sense) of predicted acceleration of the vehicle, based on the model, to measured acceleration of the vehicle in flight. The model wind corresponds to a wind hypothesis that yields the desired wind estimate when the best fit between the predicted (computed) acceleration and the observed (measured) acceleration is achieved. The observed acceleration can be obtained, for example, from an IMU onboard the airborne vehicle.

In accordance with example embodiments, the aerodynamic model can be based on the physical design and measured aerodynamic properties of the aerial vehicle. The aerial vehicle can be tested in a wind tunnel, or under other actual flight conditions, in order to set and/or adjust various parameters of the aerodynamic model, as well as to calibrate various dynamic variables corresponding to operational properties and characteristics of flight, such as actuator states of control surfaces. For estimating wind during flight, the dynamic aspects of the model can be updated and/or set based on actual operational conditions, such as actuator states during actual flight. Then the wind hypothesis can be applied to the model to compute a predicted acceleration. The wind hypothesis (e.g., analytically parameterized wind) can be adjusted iteratively to bring the predicted acceleration into statistically optimal agreement with the observed acceleration.

Numerically optimizing the fit of the predicted accelerations to the observed accelerations in this manner enables the wind to be analytically estimated without directly inverting the aerodynamic model. This type of approach is sometimes referred to as forward-fitting. Other wind-estimation techniques based on aerodynamic modeling entail numerical inversion of the aerodynamic model. However, numerical inversion can have practical and/or analytical drawbacks. For example, the more realistic and/or detailed an aerodynamic model is made to be, the more numerically and computationally complex inversion of the model becomes. Inversion of complex aerodynamic models can sometimes also be subject to numerical instabilities. In contrast, the forward-fitting approach can accommodate complex aerodynamic models at significantly lower computational cost.

Hence, the forward-fitting approach applied to wind estimation, in accordance with example embodiments, is well-suited for real-time computation using processor resources and power typical of a UAV or other similarly constrained aerial vehicle.

In further accordance with example embodiments, the forward-fitting approach can be used to adjust a wind hypothesis by optimizing a fit between predicted and observed dynamic quantities other than acceleration. For example, IMU and GPS measurements can be used to derive observed flight motions. An aerodynamic model can then be used to compute corresponding, predicted flight motions. Iterative fitting of the predicted to the observed flight motions can be carried out in a similar manner to that described above, in order to generate an optimal wind hypothesis, which can then serve as the desired wind estimate.

As with the numerical optimization technique, fitting with an aerodynamic model can be implemented by one or more processors of an aerial vehicle, and applied in real-time by the aerial vehicle during flight—i.e., an airborne vehicle—to analytically estimate wind in real-time using real-time sensor measurements made by the aerial vehicle.

It should be understood that the above embodiments, and other embodiments described herein, are provided for explanatory purposes, and are not intended to be limiting.

II. Illustrative Unmanned Vehicles

Herein, the terms "unmanned aerial vehicle" and "UAV" refer to any autonomous or semi-autonomous vehicle that is capable of performing some functions without a physically-present human pilot. Examples of flight-related functions may include, but are not limited to, sensing its environment or operating in the air without a need for input from an operator, among others. The term "aerial vehicle" (manned or unmanned) used herein refers to a vehicle configured for flight, and, depending on context, applies either during flight or when the aerial vehicle is not flying. The term "airborne vehicle" (manned or unmanned) refers to a vehicle (such as an aerial vehicle) that is flying (or during flight).

A UAV may be autonomous or semi-autonomous. For instance, some functions could be controlled by a remote human operator, while other functions are carried out autonomously. Further, a UAV may be configured to allow a remote operator to take over functions that can otherwise be controlled autonomously by the UAV. Yet further, a given type of function may be controlled remotely at one level of abstraction and performed autonomously at another level of abstraction. For example, a remote operator could control high level navigation decisions for a UAV, such as by specifying that the UAV should travel from one location to another (e.g., from the city hall in Palo Alto to the city hall in San Francisco), while the UAV's navigation system autonomously controls more fine-grained navigation decisions, such as the specific route to take between the two locations, specific flight controls to achieve the route and avoid obstacles while navigating the route, and so on. Other examples are also possible.

A UAV can be of various forms. For example, a UAV may take the form of a rotorcraft such as a helicopter or multicopter, a fixed-wing aircraft, a jet aircraft, a ducted fan aircraft, a lighter-than-air dirigible such as a blimp or steerable balloon, a tail-sitter aircraft, a glider aircraft, and/or an ornithopter, among other possibilities. Further, the terms "drone", "unmanned aerial vehicle system" ("UAVS"), or "unmanned aerial system" ("UAS") may also be used to refer to a UAV.

FIG. 1 is a simplified illustration of a UAV, according to an example embodiment. In particular, FIG. 1 shows an example of a rotorcraft 100 that is commonly referred to as a multicopter. Multicopter 100 may also be referred to as a quadcopter, as it includes four rotors 110. It should be understood that example embodiments may involve rotorcraft with more or less rotors than multicopter 100. For example, a helicopter typically has two rotors. Other examples with three or more rotors are possible as well. Herein, the term "multicopter" refers to any rotorcraft having more than two rotors, and the term "helicopter" refers to rotorcraft having two rotors.

Referring to multicopter 100 in greater detail, the four rotors 110 provide propulsion and maneuverability for the multicopter 100. More specifically, each rotor 110 includes blades that are attached to a motor 120. Configured as such the rotors may allow the multicopter 100 to take off and land vertically, to maneuver in any direction, and/or to hover. Furthermore, the pitch of the blades may be adjusted as a group and/or differentially, and may allow a multicopter 100 to perform three-dimensional aerial maneuvers such as an upside-down hover, a continuous tail-down "tic-toc," loops, loops with pirouettes, stall-turns with pirouette, knife-edge, Immelmann, slapper, and traveling flips, among others. When the pitch of all blades is adjusted to perform such aerial maneuvering, this may be referred to as adjusting the "collective pitch" of the multicopter 100. Blade-pitch adjustment may be particularly useful for rotorcraft with substantial inertia in the rotors and/or drive train, but is not limited to such rotorcraft.

Additionally or alternatively, multicopter 100 may propel and maneuver itself adjust the rotation rate of the motors, collectively or differentially. This technique may be particularly useful for small electric rotorcraft with low inertia in the motors and/or rotor system, but is not limited to such rotorcraft.

Multicopter 100 also includes a central enclosure 130 with a hinged lid 135. The central enclosure may contain, e.g., control electronics such as an inertial measurement unit (IMU) and/or an electronic speed controller, batteries, other sensors, and/or a payload, among other possibilities.

The illustrative multicopter 100 also includes landing gear 140 to assist with controlled take-offs and landings. In other embodiments, multicopters and other types of UAVs without landing gear are also possible.

In a further aspect, multicopter 100 includes rotor protectors 150. Such rotor protectors 150 can serve multiple purposes, such as protecting the rotors 110 from damage if the multicopter 100 strays too close to an object, protecting the multicopter 100 structure from damage, and protecting nearby objects from being damaged by the rotors 110. It should be understood that in other embodiments, multicopters and other types of UAVs without rotor protectors are also possible. Further, rotor protectors of different shapes, sizes, and function are possible, without departing from the scope of the invention.

A multicopter 100 may control the direction and/or speed of its movement by controlling its pitch, roll, yaw, and/or altitude. To do so, multicopter 100 may increase or decrease the speeds at which the rotors 110 spin. For example, by maintaining a constant speed of three rotors 110 and decreasing the speed of a fourth rotor, the multicopter 100 can roll right, roll left, pitch forward, or pitch backward, depending upon which motor has its speed decreased. Specifically, the multicopter may roll in the direction of the motor with the decreased speed. As another example, increasing or decreasing the speed of all rotors 110 simultaneously can result in the multicopter 100 increasing or decreasing its altitude, respectively. As yet another example, increasing or decreasing the speed of rotors 110 that are turning in the same direction can result in the multicopter 100 performing a yaw-left or yaw-right movement. These are but a few examples of the different types of movement that can be accomplished by independently or collectively adjusting the RPM and/or the direction that rotors 110 are spinning.

Figure 2:
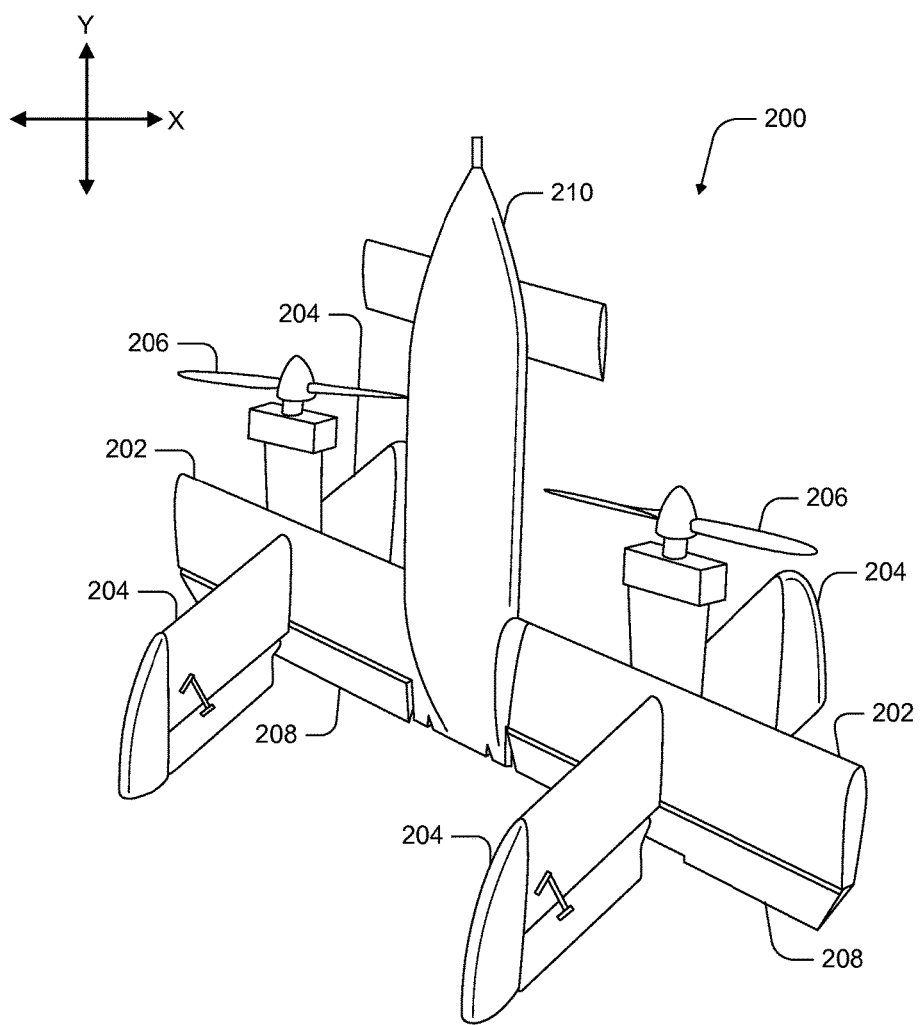

FIG. 2 is a simplified illustration of a UAV, according to an example embodiment. In particular, FIG. 2 shows an example of a tail-sitter UAV 200. In the illustrated example, the tail-sitter UAV 200 has fixed wings 202 to provide lift and allow the UAV to glide horizontally (e.g., along the x-axis, in a position that is approximately perpendicular to the position shown in FIG. 2). However, the fixed wings 202 also allow the tail-sitter UAV 200 take off and land vertically on its own.

For example, at a launch site, tail-sitter UAV 200 may be positioned vertically (as shown) with fins 204 and/or wings 202 resting on the ground and stabilizing the UAV in the vertical position. The tail-sitter UAV 200 may then take off by operating propellers 206 to generate the upward thrust (e.g., a thrust that is generally along the y-axis). Once at a suitable altitude, the tail-sitter UAV 200 may use its flaps 208 to reorient itself in a horizontal position, such that the fuselage 210 is closer to being aligned with the x-axis than the y-axis. Positioned horizontally, the propellers 206 may provide forward thrust so that the tail-sitter UAV 200 can fly in a similar manner as a typical airplane.

Variations on the illustrated tail-sitter UAV 200 are possible. For instance, tail-sitters UAVs with more or less propellers, or that utilize a ducted fan or multiple ducted fans, are also possible. Further, different wing configurations with more wings (e.g., an "x-wing" configuration with four wings), with less wings, or even with no wings, are also possible. More generally, it should be understood that other types of tail-sitter UAVs and variations on the illustrated tail-sitter UAV 200 are also possible.

As noted above, some embodiments may involve other types of UAVs, in addition or in the alternative to multicopters. For instance, FIGS. 3A and 3B are simplified illustrations of other types of UAVs, according to example embodiments.

Figure 3A:
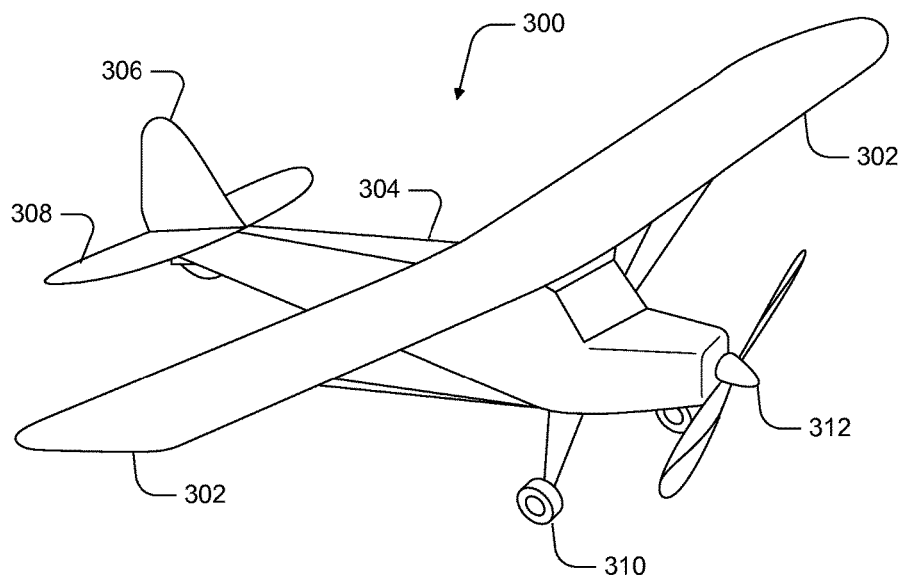

In particular, FIG. 3A shows an example of a fixed-wing aircraft 300, which may also be referred to as an airplane, an aeroplane, or simply a plane. A fixed-wing aircraft 300, as the name implies, has stationary wings 302 that generate lift based on the wing shape and the vehicle's forward airspeed. This wing configuration is different from a rotorcraft's configuration, which produces lift through rotating rotors about a fixed mast, and an ornithopter's configuration, which produces lift by flapping wings.

FIG. 3A depicts some common structures used in a fixed-wing aircraft 300. In particular, fixed-wing aircraft 300 includes a fuselage 304, two horizontal wings 302 with an airfoil-shaped cross section to produce an aerodynamic force, a vertical stabilizer 306 (or fin) to stabilize the plane's yaw (turn left or right), a horizontal stabilizer 308 (also referred to as an elevator or tailplane) to stabilize pitch (tilt up or down), landing gear 310, and a propulsion unit 312, which can include a motor, shaft, and propeller.

Figure 3B:
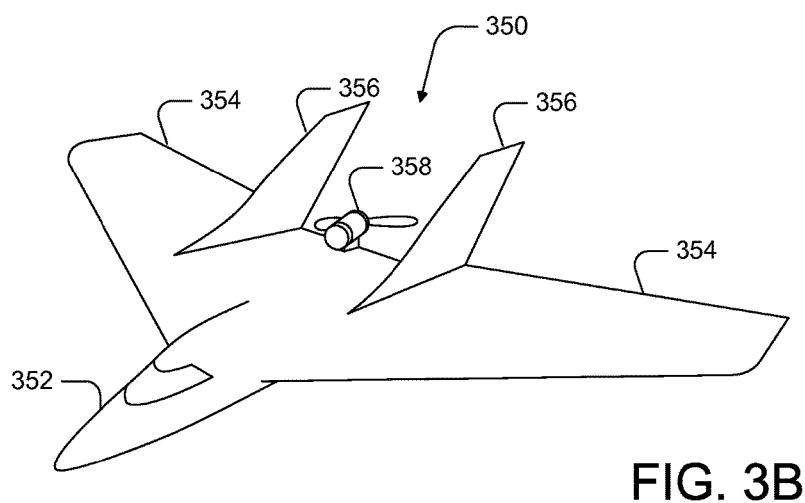

FIG. 3B shows an example of an aircraft 350 with a propeller in a pusher configuration. The term "pusher" refers to the fact that the propulsion unit 358 is mounted at the back of the aircraft and "pushes" the vehicle forward, in contrast to the propulsion unit being mounted at the front of the aircraft. Similar to the description provided for FIG. 3A, FIG. 3B depicts common structures used in the pusher plane: a fuselage 352, two horizontal wings 354, vertical stabilizers 356, and a propulsion unit 358, which can include a motor, shaft, and propeller.

UAVs can be launched in various ways, using various types of launch systems (which may also be referred to as deployment systems). A very simple way to launch a UAV is a hand launch. To perform a hand launch, a user holds a portion of the aircraft, preferably away from the spinning rotors, and throws the aircraft into the air while contemporaneously throttling the propulsion unit to generate lift.

Rather than using a hand launch procedure in which the person launching the vehicle is exposed to risk from the quickly spinning propellers, a stationary or mobile launch station can be utilized. For instance, a launch system can include supports, angled and inclined rails, and a backstop. The aircraft begins the launch system stationary on the angled and inclined rails and launches by sufficiently increasing the speed of the propeller to generate forward airspeed along the incline of the launch system. By the end of the angled and inclined rails, the aircraft can have sufficient airspeed to generate lift. As another example, a launch system may include a rail gun or cannon, either of which may launch a UAV by thrusting the UAV into flight. A launch system of this type may launch a UAV quickly and/or may launch a UAV far towards the UAV's destination. Other types of launch systems may also be utilized.

In some cases, there may be no separate launch system for a UAV, as a UAV may be configured to launch itself. For example, a "tail sitter" UAV typically has fixed wings to provide lift and allow the UAV to glide, but also is configured to take off and land vertically on its own. Other examples of self-launching UAVs are also possible.

In a further aspect, various other types of unmanned vehicles may be utilized to provide remote medical support. Such vehicles may include, for example, unmanned ground vehicles (UGVs), unmanned space vehicles (USVs), and/or unmanned underwater vehicles (UUVs). A UGV may be a vehicle which is capable of sensing its own environment and navigating surface-based terrain without input from a driver. Examples of UGVs include watercraft, cars, trucks, buggies, motorcycles, treaded vehicles, and retrieval duck decoys, among others. A UUV is a vehicle that is capable of sensing its own environment and navigating underwater on its own, such as a submersible vehicle. Other types of unmanned vehicles are possible as well.

III. Illustrative UAV Systems

Figure 4:
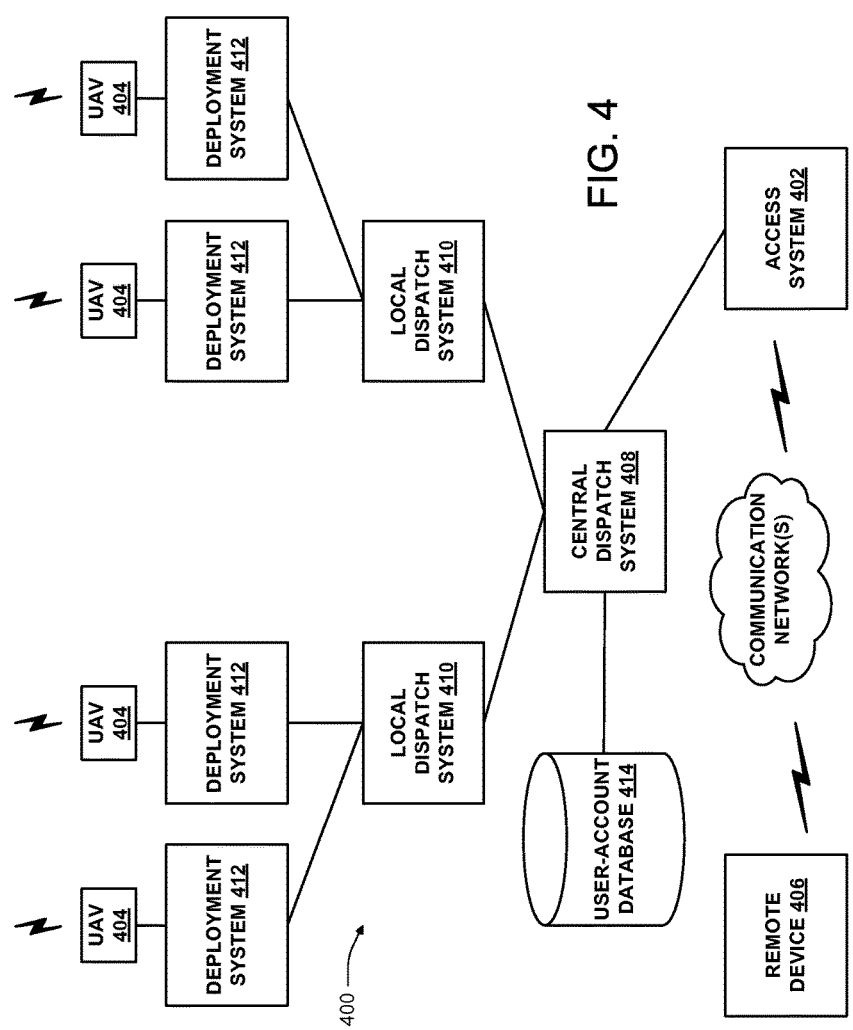
FIG. 4 is a simplified block diagram illustrating a network of unmanned aerial vehicles, according to an example embodiment.

UAV systems may be implemented in order to provide various services. In particular, UAVs may be provided at a number of different launch sites, which may be in communication with regional and/or central control systems. Such a distributed UAV system may allow UAVs to be quickly deployed to provide services across a large geographic area (e.g., that is much larger than the flight range of any single UAV). For example, UAVs capable of carrying payloads may be distributed at a number of launch sites across a large geographic area (possibly even throughout an entire country, or even worldwide), in order to deliver various items to locations throughout the geographic area. As another example, a distributed UAV system may be provided in order to provide remote medical support, via UAVs. FIG. 4 is a simplified block diagram illustrating a distributed UAV system 400, according to an example embodiment.

In an illustrative UAV system 400, an access system 402 may allow for interaction with, control of, and/or utilization of a network of UAVs 404. In some embodiments, an access system 402 may be a computing system that allows for human-controlled dispatch of UAVs 404. As such, the control system may include or otherwise provide a user interface (UI) via which a user can access and/or control UAVs 404. In some embodiments, dispatch of UAVs 404 may additionally or alternatively be accomplished via one or more automated processes.

Further, an access system 402 may provide for remote operation of a UAV. For instance, an access system 402 may allow an operator to control the flight of a UAV via user interface (UI). As a specific example, an operator may use an access system to dispatch a UAV 404 to deliver a package to a target location, or to travel to the location of a medical situation with medical-support items. The UAV 404 may then autonomously navigate to the general area of the target location. At this point, the operator may use the access system 402 to take over control of the UAV 404, and navigate the UAV to the target location (e.g., to a particular person to whom a package is being sent). Other examples of remote operation of a UAV are also possible.

In an illustrative embodiment, UAVs 404 may take various forms. For example, each UAV 404 may be a UAV such as those illustrated in FIGS. 1, 2, 3A, and 3B. However, UAV system 400 may also utilize other types of UAVs without departing from the scope of the invention. In some implementations, all UAVs 404 may be of the same or a similar configuration. However, in other implementations, UAVs 404 may include a number of different types of UAVs. For instance, UAVs 404 may include a number of types of UAVs, with each type of UAV being configured for a different type or types of medical support.

A remote device 406 may take various forms. Generally, a remote device 406 may be any device via which a direct or indirect request to dispatch UAV can be made. (Note that an indirect request may involve any communication that may be responded to by dispatching a UAV; e.g., requesting a package delivery, or sending a request for medical support). In an example embodiment, a remote device 406 may be a mobile phone, tablet computer, laptop computer, personal computer, or any network-connected computing device. Further, in some instances, remote device 406 may not be a computing device. As an example, a standard telephone, which allows for communication via plain old telephone service (POTS), may serve as a remote device 406. Other types of remote devices are also possible.

Further, a remote device 406 may be configured to communicate with access system 402 via one or more types of communication network(s). For example, a remote device 406 could communicate with access system 402 (or via a human operator of the access system) by placing a phone call over a POTS network, a cellular network, and/or a data network such as the Internet. Other types of networks may also be utilized.

In some embodiments, a remote device 406 may be configured to allow a user to request delivery of one or more items to a desired location. For example, a user could request UAV delivery of a package to their home via their mobile phone, tablet, or laptop. As another example, a user could request dynamic delivery to whatever location they are at the time of delivery. To provide such dynamic delivery, a UAV system 400 may receive location information (e.g., GPS coordinates, etc.) from the user's mobile phone, or any other device on the user's person, such that a UAV can navigate to the user's location (as indicated by their mobile phone).

In some embodiments, a remote device 406 may be configured to allow a user to request medical support. For example, a person may use their mobile phone, a POTS phone, or a VoIP phone, to place an emergency call (e.g., a 9-1-1 call) and request that medical support be provided at the scene of an accident. Further, note that a request for medical support need not be explicit. For instance, a person may place a 9-1-1 call to report an emergency situation. When the 9-1-1 operator receives such a call, the operator may evaluate the information that is provided and decide that medical support is appropriate. Accordingly, the operator may use an access system 402 to dispatch a UAV 404.

As noted, a remote device 406 may be configured to determine and/or provide an indication of its own location. For example, remote device 406 may include a GPS system so that it can include GPS location information (e.g., GPS coordinates) in a communication to an access system 402 and/or to a dispatch system such as central dispatch system 408. As another example, a remote device 406 may use a technique that involves triangulation (e.g., between base stations in a cellular network) to determine its location. Alternatively, another system such as a cellular network may use a technique that involves triangulation to determine the location of a remote device 406, and then send a location message to the remote device 406 to inform the remote device of its location. Other location-determination techniques are also possible.

In an illustrative arrangement, central dispatch system 408 may be a server or group of servers, which is configured to receive dispatch messages requests and/or dispatch instructions from an access system 402. Such dispatch messages may request or instruct the central dispatch system 408 to coordinate the deployment of UAVs to various target locations. A central dispatch system 408 may be further configured to route such requests or instructions to local dispatch systems 410. To provide such functionality, central dispatch system 408 may communicate with access system 402 via a data network, such as the Internet or a private network that is established for communications between access systems and automated dispatch systems.

In the illustrated configuration, central dispatch system 408 may be configured to coordinate the dispatch of UAVs 404 from a number of different local dispatch systems 410. As such, central dispatch system 408 may keep track of which UAVs 404 are located at which local dispatch systems 410, which UAVs 404 are currently available for deployment, and/or which services or operations each of the UAVs 404 is configured for (in the event that a UAV fleet includes multiple types of UAVs configured for different services and/or operations). Additionally or alternatively, each local dispatch system 410 may be configured to track which of its associated UAVs 404 are currently available for deployment and/or which services or operations each of its associated UAVs is configured for.

In some cases, when central dispatch system 408 receives a request for UAV-related service from an access system 402, central dispatch system 408 may select a specific UAV 404 to dispatch. The central dispatch system 408 may accordingly instruct the local dispatch system 410 that is associated with the selected UAV to dispatch the selected UAV. The local dispatch system 410 may then operate its associated deployment system 412 to launch the selected UAV. In other cases, a central dispatch system 408 may forward a request for a UAV-related service to a local dispatch system 410 that is near the location where the support is requested, and leave the selection of a particular UAV 404 to the local dispatch system 410.

In an example configuration, a local dispatch system 410 may be implemented in a computing system at the same location as the deployment system or systems 412 that it controls. For example, in some embodiments, a local dispatch system 410 could be implemented by a computing system at a building, such as a fire station, where the deployment systems 412 and UAVs 404 that are associated with the particular local dispatch system 410 are also located. In other embodiments, a local dispatch system 410 could be implemented at a location that is remote to its associated deployment systems 412 and UAVs 404.

Numerous variations on and alternatives to the illustrated configuration of UAV system 400 are possible. For example, in some embodiments, a user of a remote device 406 could request medical support directly from a central dispatch system 408. To do so, an application may be implemented on a remote device 406 that allows the user to provide information regarding a requested service, and generate and send a data message to request that the UAV system provide the service. In such an embodiment, central dispatch system 408 may include automated functionality to handle requests that are generated by such an application, evaluate such requests, and, if appropriate, coordinate with an appropriate local dispatch system 410 to deploy a UAV.

Further, in some implementations, some or all of the functionality that is attributed herein to central dispatch system 408, local dispatch system(s) 410, access system 402, and/or deployment system(s) 412 could be combined in a single system, implemented in a more complex system, and/or redistributed among central dispatch system 408, local dispatch system(s) 410, access system 402, and/or deployment system(s) 412 in various ways.

Yet further, while each local dispatch system 410 is shown as having two associated deployment systems, a given local dispatch system 410 may have more or less associated deployment systems. Similarly, while central dispatch system 408 is shown as being in communication with two local dispatch systems 410, a central dispatch system may be in communication with more or less local dispatch systems 410.

In a further aspect, a deployment system 412 may take various forms. In general, a deployment system may take the form of or include a system for physically launching a UAV 404. Such a launch system may include features that allow for a human-assisted UAV launch and/or features that provide for an automated UAV launch. Further, a deployment system 412 may be configured to launch one particular UAV 404, or to launch multiple UAVs 404.

A deployment system 412 may further be configured to provide additional functions, including for example, diagnostic-related functions such as verifying system functionality of the UAV, verifying functionality of devices that are housed within a UAV (e.g., such as a defibrillator, a mobile phone, or an HMD), and/or maintaining devices or other items that are housed in the UAV (e.g., by charging a defibrillator, mobile phone, or HMD, or by checking that medicine has not expired).

In some embodiments, the deployment systems 412 and their corresponding UAVs 404 (and possibly associated local dispatch systems 410) may be strategically distributed throughout an area such as a city. For example, deployment systems 412 may be located on the roofs of certain municipal buildings, such as fire stations, which can thus serve as the dispatch locations for UAVs 404. Fire stations may function well for UAV dispatch, as fire stations tend to be distributed well with respect to population density, their roofs tend to be flat, and the use of firehouse roofs as leased spaces for UAV dispatch could further the public good. However, deployment systems 412 (and possibly the local dispatch systems 410) may be distributed in other ways, depending upon the particular implementation. As an additional example, kiosks that allow users to transport packages via UAVs may be installed in various locations. Such kiosks may include UAV launch systems, and may allow a user to provide their package for loading onto a UAV and pay for UAV shipping services, among other possibilities. Other examples are also possible.

In a further aspect, a UAV system 400 may include or have access to a user-account database 414. The user-account database 414 may include data for a number of user-accounts, and which are each associated with one or more person. For a given user-account, the user-account database 414 may include data related to or useful in providing UAV-related services. Typically, the user data associated with each user-account is optionally provided by an associated user and/or is collected with the associated user's permission.

Further, in some embodiments, a person may have to register for a user-account with the UAV system 400 in order to use or be provided with UAV-related services by the UAVs 404 of UAV system 400. As such, the user-account database 414 may include authorization information for a given user-account (e.g., a user-name and password), and/or other information that may be used to authorize access to a user-account.

In some embodiments, a person may associate one or more of their devices with their user-account, such that they can be provided with access to the services of UAV system 400. For example, when a person uses an associated mobile phone to, e.g., place a call to an operator of access system 402 or send a message requesting a UAV-related service to a dispatch system, the phone may be identified via a unique device identification number, and the call or message may then be attributed to the associated user-account. Other examples are also possible.

IV. Illustrative Components of a UAV

Figure 5:
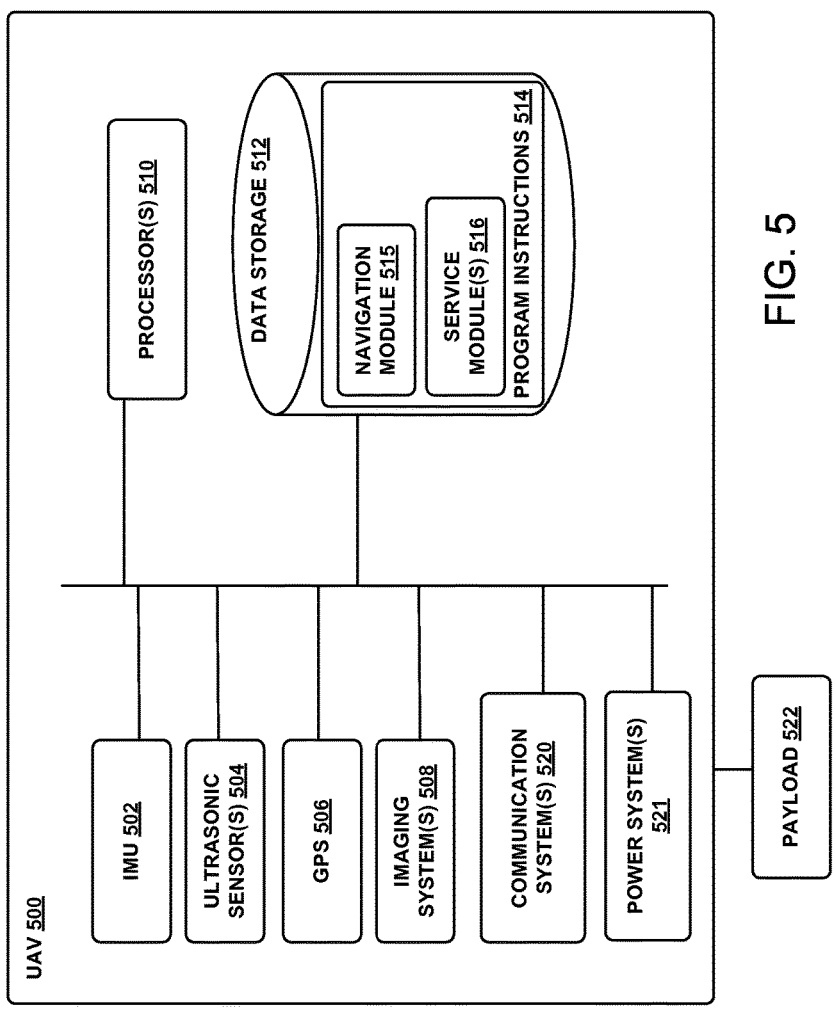
FIG. 5 is a simplified block diagram illustrating components of an unmanned aerial vehicle, according to an example embodiment.

FIG. 5 is a simplified block diagram illustrating components of a UAV 500, according to an example embodiment. UAV 500 may take the form of or be similar in form to one of the UAVs 100, 200, 300, and 350 shown in FIGS. 1, 2, 3A, and 3B. However, a UAV 500 may also take other forms.

UAV 500 may include various types of sensors, and may include a computing system configured to provide the functionality described herein. In the illustrated embodiment, the sensors of UAV 500 include an inertial measurement unit (IMU) 502, ultrasonic sensor(s) 504, GPS 506, imaging system(s) 508, among other possible sensors and sensing systems.

In the illustrated embodiment, UAV 500 also includes one or more processors 510. A processor 510 may be a general-purpose processor or a special purpose processor (e.g., digital signal processors, application specific integrated circuits, etc.). The one or more processors 510 can be configured to execute computer-readable program instructions 514 that are stored in the data storage 512 and are executable to provide the functionality of a UAV described herein.

The data storage 512 may include or take the form of one or more computer-readable storage media that can be read or accessed by at least one processor 510. The one or more computer-readable storage media can include volatile and/or non-volatile storage components, such as optical, magnetic, organic or other memory or disc storage, which can be integrated in whole or in part with at least one of the one or more processors 510. In some embodiments, the data storage 512 can be implemented using a single physical device (e.g., one optical, magnetic, organic or other memory or disc storage unit), while in other embodiments, the data storage 512 can be implemented using two or more physical devices.

As noted, the data storage 512 can include computer-readable program instructions 514 and perhaps additional data, such as diagnostic data of the UAV 500. As such, the data storage 514 may include program instructions to perform or facilitate some or all of the UAV functionality described herein. For instance, in the illustrated embodiment, program instructions 514 include a navigation module 515 and one or more service modules 516.

A. Sensors

In an illustrative embodiment, IMU 502 may include both an accelerometer and a gyroscope, which may be used together to determine the orientation of the UAV 500. In particular, the accelerometer can measure the orientation of the vehicle with respect to earth, while the gyroscope measures the rate of rotation around an axis. IMUs are commercially available in low-cost, low-power packages. For instance, an IMU 502 may take the form of or include a miniaturized MicroElectroMechanical System (MEMS) or a NanoElectroMechanical System (NEMS). Other types of IMUs may also be utilized.

An IMU 502 may include other sensors, in addition to accelerometers and gyroscopes, which may help to better determine position and/or help to increase autonomy of the UAV 500. Two examples of such sensors are magnetometers and pressure sensors. Other examples are also possible. (Note that a UAV could also include such additional sensors as separate components from an IMU.)

While an accelerometer and gyroscope may be effective at determining the orientation of the UAV 500, slight errors in measurement may compound over time and result in a more significant error. However, an example UAV 500 may be able mitigate or reduce such errors by using a magnetometer to measure direction. One example of a magnetometer is a low-power, digital 3-axis magnetometer, which can be used to realize an orientation independent electronic compass for accurate heading information. However, other types of magnetometers may be utilized as well.

UAV 500 may also include a pressure sensor or barometer, which can be used to determine the altitude of the UAV 500. Alternatively, other sensors, such as sonic altimeters or radar altimeters, can be used to provide an indication of altitude, which may help to improve the accuracy of and/or prevent drift of an IMU.

In a further aspect, UAV 500 may include one or more sensors that allow the UAV to sense objects in the environment. For instance, in the illustrated embodiment, UAV 500 includes ultrasonic sensor(s) 504. Ultrasonic sensor(s) 504 can determine the distance to an object by generating sound waves and determining the time interval between transmission of the wave and receiving the corresponding echo off an object. A typical application of an ultrasonic sensor for unmanned vehicles or IMUs is low-level altitude control and obstacle avoidance. An ultrasonic sensor can also be used for vehicles that need to hover at a certain height or need to be capable of detecting obstacles. Other systems can be used to determine, sense the presence of, and/or determine the distance to nearby objects, such as a light detection and ranging (LIDAR) system, laser detection and ranging (LA-DAR) system, and/or an infrared or forward-looking infrared (FLIR) system, among other possibilities.

UAV 500 also includes a GPS receiver 506. The GPS receiver 506 may be configured to provide data that is typical of well-known GPS systems, such as the GPS coordinates of the UAV 500. Such GPS data may be utilized by the UAV 500 for various functions. As such, the UAV may use its GPS receiver 506 to help navigate to the caller's location, as indicated, at least in part, by the GPS coordinates provided by their mobile device. Other examples are also possible.

UAV 500 may also include one or more imaging system(s) 508. For example, one or more still and/or video cameras may be utilized by a UAV 500 to capture image data from the UAV's environment. As a specific example, charge-coupled device (CCD) cameras or complementary metal-oxide-semiconductor (CMOS) cameras can be used with unmanned vehicles. Such imaging sensor(s) 508 have numerous possible applications, such as obstacle avoidance, localization techniques, ground tracking for more accurate navigation (e.g., by applying optical flow techniques to images), video feedback, and/or image recognition and processing, among other possibilities.

In a further aspect, UAV 500 may use its one or more imaging system(s) 508 to help in determining location. For example, UAV 500 may capture imagery of its environment and compare it to what it expects to see in its environment given current estimated position (e.g., its current GPS coordinates), and refine its estimate of its position based on this comparison.

In a further aspect, UAV 500 may include one or more microphones. Such microphones may be configured to capture sound from the UAV's environment.

B. Navigation and Location Determination

The navigation module 515 may provide functionality that allows the UAV 500 to, e.g., move about in its environment and reach a desired location. To do so, the navigation module 515 may control the altitude and/or direction of flight by controlling the mechanical features of the UAV that affect flight (e.g., rotors 110 of UAV 100).

In order to navigate the UAV 500 to a target location, a navigation module 515 may implement various navigation techniques, such as map-based navigation and localization-based navigation, for instance. With map-based navigation, the UAV 500 may be provided with a map of its environment, which may then be used to navigate to a particular location on the map. With localization-based navigation, the UAV 500 may be capable of navigating in an unknown environment using localization. Localization-based navigation may involve a UAV 500 building its own map of its environment and calculating its position within the map and/or the position of objects in the environment. For example, as a UAV 500 moves throughout its environment, the UAV 500 may continuously use localization to update its map of the environment. This continuous mapping process may be referred to as simultaneous localization and mapping (SLAM). Other navigation techniques may also be utilized.

In some embodiments, the navigation module 515 may navigate using a technique that relies on waypoints. In particular, waypoints are sets of coordinates that identify points in physical space. For instance, an air-navigation waypoint may be defined by a certain latitude, longitude, and altitude. Accordingly, navigation module 515 may cause UAV 500 to move from waypoint to waypoint, in order to ultimately travel to a final destination (e.g., a final waypoint in a sequence of waypoints).

In a further aspect, navigation module 515 and/or other components and systems of UAV 500 may be configured for "localization" to more precisely navigate to the scene of a medical situation. More specifically, it may be desirable in certain situations for a UAV to be close to the person to whom an item is being delivered by a UAV (e.g., within reach of the person). To this end, a UAV may use a two-tiered approach in which it uses a more-general location-determination technique to navigate to a target location or area that is associated with the medical situation, and then use a more-refined location-determination technique to identify and/or navigate to the target location within the general area.

For example, a UAV 500 may navigate to the general area of a person to whom an item is being delivered using waypoints. Such waypoints may be pre-determined based on GPS coordinates provided by a remote device at the target delivery location. The UAV may then switch to a mode in which it utilizes a localization process to locate and travel to a specific location of the person in need. For instance, if a person is having a heart attack at a large stadium, a UAV 500 carrying a medical package may need to be within reach of the person or someone near the person so that the can take items from the package. However, a GPS signal may only get a UAV so far, e.g., to the stadium. A more precise location-determination technique may then be used to find the specific location of the person within the stadium.

Various types of location-determination techniques may be used to accomplish localization of a person or a device once a UAV 500 has navigated to the general area of the person or device. For instance, a UAV 500 may be equipped with one or more sensory systems, such as, for example, imaging system(s) 508, a directional microphone array (not shown), ultrasonic sensors 504, infrared sensors (not shown), and/or other sensors, which may provide input that the navigation module 515 utilizes to navigate autonomously or semi-autonomously to the specific location of a person.

As another example, once the UAV 500 reaches the general area of a target delivery location (or of a moving subject such as a person or their mobile device), the UAV 500 may switch to a "fly-by-wire" mode where it is controlled, at least in part, by a remote operator, who can navigate the UAV 500 to the specific location of the person in need. To this end, sensory data from the UAV 500 may be sent to the remote operator to assist them in navigating the UAV to the specific location. For example, the UAV 500 may stream a video feed or a sequence of still images from the UAV's imaging system(s) 508. Other examples are possible.

As yet another example, the UAV 500 may include a module that is able to signal to a passer-by for assistance in either reaching the specific target delivery location; for example, a UAV may displaying a visual message requesting such assistance in a graphic display, play an audio message or tone through speakers to indicate the need for such assistance, among other possibilities. Such a visual or audio message might indicate that assistance is needed in delivering the UAV 500 to a particular person or a particular location, and might provide information to assist the passer-by in delivering the UAV 500 to the person or location (e.g., a description or picture of the person or location, and/or the person or location's name), among other possibilities. Such a feature can be useful in a scenario in which the UAV is unable to use sensory functions or another location-determination technique to determine the specific location of the person. However, this feature is not limited to such scenarios.

In some embodiments, once a UAV 500 arrives at the general area of a person who requested service and/or at the general area that includes a target delivery location, the UAV may utilize a beacon from a user's remote device (e.g., the user's mobile phone) to locate the person. Such a beacon may take various forms. As an example, consider the scenario where a remote device, such as the mobile phone of a person who requested a UAV delivery, is able to send out directional signals (e.g., an RF signal, a light signal and/or an audio signal). In this scenario, the UAV may be configured to navigate by "sourcing" such directional signals—in other words, by determining where the signal is strongest and navigating accordingly. As another example, a mobile device can emit a frequency, either in the human range or outside the human range, and the UAV can listen for that frequency and navigate accordingly. As a related example, if the UAV is listening for spoken commands, then the UAV could utilize spoken statements, such as "Help! I'm over here!" to source the specific location of the person in need of medical assistance.

In an alternative arrangement, a navigation module may be implemented at a remote computing device, which communicates wirelessly with the UAV. The remote computing device may receive data indicating the operational state of the UAV, sensor data from the UAV that allows it to assess the environmental conditions being experienced by the UAV, and/or location information for the UAV. Provided with such information, the remote computing device may determine altitudinal and/or directional adjustments that should be made by the UAV and/or may determine how the UAV should adjust its mechanical features (e.g., rotors 110 of UAV 100) in order to effectuate such movements. The remote computing system may then communicate such adjustments to the UAV so it can move in the determined manner.

C. Communication Systems

In a further aspect, UAV 500 includes one or more communication systems 520. The communications systems 520 may include one or more wireless interfaces and/or one or more wireline interfaces, which allow UAV 500 to communicate via one or more networks. Such wireless interfaces may provide for communication under one or more wireless communication protocols, such as Bluetooth, Wi-Fi (e.g., an IEEE 802.11 protocol), Long-Term Evolution (LTE), WiMAX (e.g., an IEEE 802.16 standard), a radio-frequency ID (RFID) protocol, near-field communication (NFC), and/or other wireless communication protocols. Such wireline interfaces may include an Ethernet interface, a Universal Serial Bus (USB) interface, or similar interface to communicate via a wire, a twisted pair of wires, a coaxial cable, an optical link, a fiber-optic link, or other physical connection to a wireline network.

In an example embodiment, a UAV 500 may include communication systems 520 that allow for both short-range communication and long-range communication. For example, the UAV 500 may be configured for short-range communications using Bluetooth and for long-range communications under a CDMA protocol. In such an embodiment, the UAV 500 may be configured to function as a "hot spot;" or in other words, as a gateway or proxy between a remote support device and one or more data networks, such as cellular network and/or the Internet. Configured as such, the UAV 500 may facilitate data communications that the remote support device would otherwise be unable to perform by itself.

For example, UAV 500 may provide a Wi-Fi connection to a remote device, and serve as a proxy or gateway to a cellular service provider's data network, which the UAV might connect to under an LTE or a 3G protocol, for instance. The UAV 500 could also serve as a proxy or gateway to a high-altitude balloon network, a satellite network, or a combination of these networks, among others, which a remote device might not be able to otherwise access.

In examples, the UAV 500 may include communication systems 520 that operate at different frequencies. Moreover, each communication system 520 may provide different bandwidth capacities (e.g., one may provide a high bandwidth capacity, while another provides a lower bandwidth capacity but may be more resilient to line-of-sight obstructions). In some cases, the UAV 500 may include multiple communication systems 520 that are configured to pair with communication systems of a flight guidance system.

D. Power Systems

In a further aspect, UAV 500 may include power system(s) 521. A power system 521 may include one or more batteries for providing power to the UAV 500. In one example, the one or more batteries may be rechargeable and each battery may be recharged via a wired connection between the battery and a power supply and/or via a wireless charging system, such as an inductive charging system that applies an external time-varying magnetic field to an internal battery.

E. Payloads

A UAV 500 may employ various systems and configurations in order to transport items. In the illustrated embodiment, a payload 522 may serve as a compartment that can hold one or more items, such that a UAV 500 can deliver the one or more items to a target delivery location. For example, as shown in FIG. 1, a UAV 100 can include a compartment 135, in which an item or items may be transported. As another example, the UAV can include a pick-and-place mechanism, which can pick up and hold the item while the UAV is in flight, and then release the item during or after the UAV's descent. As yet another example, a UAV could include an air-bag drop system, a parachute drop system, and/or a winch system that is operable from high above a medical situation to drop or lower an item or items to the scene of the medical situation. Other examples are also possible. In some implementations, the payload 522 of a given UAV 500 may include or take the form of a "package" designed to transport medical-support items to a target delivery location. For example, a medical-support UAV may include a package with one or more items for medical support in the particular medical situation, and/or one or more medical-support modules 516 that are designed to provide medical support in the particular medical situation. In some cases, a UAV 500 may include a package that is designed for a particular medical situation such as choking, cardiac arrest, shock, asthma, drowning, etc. In other cases, a UAV 500 may include a package that is designed for a number of different medical situations, which may be associated in some way.

Such medical support items may aid in diagnosing and/or treating a person who needs medical assistance, or may serve other purposes. Example of medical-support items include, but are not limited to: (a) medicines, (b) diagnostic devices, such as a pulse oximeter, blood pressure sensor, or EKG sensor, (c) treatment devices, such as an EpiPen, a first aid kit, or various kinds of defibrillators (e.g., an automated external defibrillator (AED)), and/or (d) remote support devices, such as a mobile phone or a head-mountable device (HMD), among other possibilities. Note that some items that are electronic may include one or more batteries to provide power to the item. These batteries may be rechargeable and may be recharged using one or more wired or wireless charging systems. In addition or on in the alternative, an item may be integrated with one or more batteries in the power system 521 for power.

In some embodiments, a UAV 500 could include an integrated system or device for administering or assisting in the administration of medical care (e.g., a system or device having one or more components that are built in to the structure of the UAV itself). For example, as noted above, a UAV could include an oxygen-therapy system. In an example configuration, an oxygen-therapy system might include a mask that is connected via tubing to an on-board oxygen source. Configured as such, the UAV could release the oxygen mask when it reaches a person in need of oxygen (e.g., at a fire scene).

As another example of a UAV with an integrated medical-support device, a UAV 500 might function as a mobile defibrillator. Specifically, rather than carry a stand-alone defibrillator that can then be removed from the UAV for use, the UAV itself may function as a defibrillator.

F. Service Modules

As noted above, UAV 500 may include one or more service modules 516. The one or more service modules 516 include software, firmware, and/or hardware that may help to provide or assist in the provision of the UAV-related services.

Configured as such, a UAV 500 may provide various types of service. For instance, a UAV 500 may have stored information that can be provided to a person or persons at the target location, in order to assist the person or persons in various ways. For example, a UAV may include a video or audio file with instructions for performing some task, which the UAV can play out to a person at the target location. As another example, a UAV may include an interactive program to assist a person at the target location in performing some task. For instance, a UAV may include an application that analyzes the person's speech to detect questions related to the medical situation and/or that provides a text-based interface via which the person can ask such questions, and then determines and provides answers to such questions.

In some embodiments, a UAV 500 may facilitate communication between a layperson and/or medical personnel at the scene and medical personnel at a remote location. As an example, a service module 516 may provide a user interface via which a person at the scene can use a communication system 520 of the UAV to communicate with an emergency medical technician at a remote location. As another example, the UAV 500 can unlock certain capabilities of a remote device, such as a mobile phone, which is near the UAV at the scene of a medical situation. Such capabilities may be inaccessible to a user of the remote device, unless the remote device is within a certain distance from the UAV such that the UAV can unlock the capabilities. For example, a UAV may send the remote device a security key that allows the remote device to establish a secure connection to communicate with medical personnel at a remote location. Other examples are also possible.

V. Wind Estimation

As noted above, wind estimation by a UAV can be important because in order for an airborne vehicle to move in a desired way, the effect of the wind on the vehicle generally needs to be compensated and/or accounted for. For a vehicle in flight, a dynamic relation between air speed, ground speed, and wind exists from which wind may be calculated. Ground speed can be derived directly from measurements of one or another type of onboard sensor, such as a global position satellite (GPS) system receiver. In principle, air speed can also be derived directly from sensor measurements, for example by using an airflow sensor such as a pitot tube. However, airflow sensors are sometimes omitted from UAVs or other types of aerial vehicles for practical and/or design considerations. In the absence of air speed measurements, the dynamic relation cannot be applied directly, and wind must instead be estimate in some other way.

Accordingly, an airborne vehicle, such as a UAV, can employ computational techniques in accordance with example embodiments for analytically estimating wind in the absence of airflow measurements. In one example technique, a large number of samples of ground-track measurements and corresponding heading measurements of an airborne vehicle are used in a mathematical optimization of a wind-driven hypothesis of deviations between the two types of measurement at each of multiple sampling times. In another example technique, an aerodynamic model of an aerial vehicle can be used to adjust parameters of a wind hypothesis in order to achieve a best-fit (e.g., in a least-squares sense) between predicted and measured acceleration of the aerial vehicle during flight. Both example techniques can be implemented and carried out as computer-based methods on a processing system of the aerial vehicle. In accordance with example embodiments, the analytical properties of both techniques enable them to be realized in algorithmic forms that are computationally fast and efficient, and therefore well-suited for computing systems that may be typical of UAVs or the like.

Referring again to FIG. 5, the computer-based methods could be implemented as machine-readable instructions, such as program instructions 514, executable by the one or more processors, such as processor(s) 510, of a computing system of the UAV 500. Each method could also include data components, as described below. The machine-language instructions and data components could be stored in data storage 512, which could take the form of a tangible, non-transitory computer-readable medium (or other article of manufacture), such as magnetic or optical disk, or the like. Measurements utilized in the two techniques could be supplied by one or another sensor or device, such as IMU 502 and/or GPS 506, exemplified in FIG. 5.

For an airborne vehicle, a basic relation between its ground-speed vector S, its airspeed vector V, and the wind-speed vector W at its flight position can be expressed as:

$$S = V + W. \quad [1]$$

As can be seen, if S and V can be measured, W can be determined directly from equation [1]. When direct airspeed measurements are not available, the basic relation in equation [1] can still provide a conceptual context for understanding two computational techniques described herein for analytically determining wind. The first technique involves optimizing a relationship between a wind hypothesis and various aspects of flight kinematics of an airborne vehicle in order to determine an optimal estimate of wind. For purposes of discussion herein, the first technique is referred to as a "kinematic estimation." The second technique involves applying a wind hypothesis to an aerodynamic model of an aerial vehicle during flight while adjusting the wind hypothesis so as to minimize deviations between measured dynamical variables of the vehicle and those predicted by the model. For purposes of discussion herein, the second technique is referred to as a "model-based estimation."

Note that the term "wind estimation" is used herein to distinguish direct determination of wind, such as by way of equation [1], which employs sensor measurements directly related to wind, from less direct analytical derivations specified in the techniques described herein. In particular, "estimation" as used in connection with determining wind by these techniques is not intended to imply that a resulting wind "estimate" is necessarily less precise than a direct determination might be. That is, the techniques described herein, and presented under a general heading of "estimation," can also be characterized as computational determinations of wind.

1. Kinematic Estimation

The kinematic estimation technique invokes three assumptions that are generally found to be well supported in many practical flight scenarios of airborne vehicles. First, it is assumed that an estimate of the yaw of the airborne vehicle is accurate and does not drift over time. Second, it is assumed that the wind velocity does not change significantly for a sample set of measurements over which the kinematic wind estimate is determined. And third, it is assumed that a forward direction of the airborne vehicle— e.g., the forward direction of the fuselage 210—is aligned with the (unknown) airspeed vector. Note that the forward direction of the airborne vehicle can be represented as a unit vector. Given these assumptions, an estimate of the wind vector can be derived analytically from any two pairs of measurements of orientation (heading) and ground-speed velocity of the airborne vehicle acquired while the vehicle is flying in two different directions. By incorporating a large multiplicity of such pairs of measurements, the statistical uncertainty—e.g., measurement noise—of the derived wind estimate can be significantly reduced.

From the assumption that the forward direction of the fuselage is aligned with the airspeed vector, it follows that one measurement pair of vehicle orientation and ground-speed vector at one sample time places a line constraint on the wind vector. Then, a second measurement pair at a different sample time and different flight direction puts a second line constraint on the wind vector. The wind vector is then fully constrained in an analytical sense. However, with just two sample pairs, statistical uncertainties (e.g., statistical measurement errors) may limit the statistical reliability of the derived result below a specified or acceptable confidence level. In accordance with example embodiments of kinematic estimation, the statistical significance of the derived wind estimate can be increased by applying the analysis to a large sample of measurement pairs. This approach then casts the computation as an optimization problem.

In accordance with example embodiments, the optimization problem can be formulated for n sample pairs of heading and ground-speed velocity measurement, expressed as:

$$\text{wind} = \operatorname{argmin}_{v_i, \overline{W}} \sum_i \left( \left\| \vec{F}_i v_i + \overline{W} - \vec{S}_i \right\|_{\Sigma_{\vec{S}_i}}^2 + \left\| v_i + \overline{v} \right\|_{\Sigma_v}^2 \right), \quad [2]$$

where i indexes the i-th measurement sample, and $\overline{W} \in \mathbb{R}^3$ is the wind-speed vector, $v_i \in \mathbb{R}$ is the magnitude of the airspeed vector for the i-th sample $\vec{F}_i \in S^2$ is a three-dimensional unit vector of the fuselage forward direction, $S_i \in \mathbb{R}^3$ is the ground-speed vector for the i-th sample, and $\Sigma_{\vec{S}_i} \in \mathbb{R}^{3 \times 3}$ is the covariance of the ground-speed vector. Equation [2] also includes a cost function (the second term in the summation) in which the nominal expected airspeed $\vec{v}$ is an airspeed prior, and $\Sigma_v$ is the variance of $\bar{v}$. For some samples in the computation, the prior may be omitted, in which case $\Sigma_v$ may be considered to be infinite (i.e., resulting in rows of zeros in the system Jacobian).

Comparing equation [2] with equation [1], and momentarily ignoring the cost function, the optimization problem can be thought of conceptually as minimizing the difference between the terms representing the right and left sides of equation [1] for a large sample of measurement pairs. More specifically, the optimization problem formulated in equation [2] seeks to jointly estimate the airspeed magnitudes and the wind for every sample, which can result in a very large (but sparse) full least-squares system Jacobian. To avoid expensive computation working with the full system, QR decomposition can be used to marginalize out the airspeed magnitudes $v_i$, yielding a constraint only on the wind vector $\vec{W}$ for each sample, and thus a 2n×3 wind Jacobian, where, again, n is the number of samples. Each sample yields only two rows in the wind Jacobian, because each constraint on the wind vector is only of rank 2.

In order to marginalize out the airspeed vector, a 4×4 augmented Jacobian for a single constraint is first formed. In accordance with example embodiments, this can be formulated as:

$$\overline{A}_i = \begin{bmatrix} U_i & 0 \\ 0 & V_i \end{bmatrix} \begin{bmatrix} \vec{F} & I_{3\times 3} & S_i \\ 1 & 0 & \bar{v} \end{bmatrix}, \quad [3]$$

where $U_i$ is the Cholesky decomposition of the ground-speed covariance $\Sigma_{\vec{S}_i}$ satisfying $(U_i^T U_i)^{-1} = \Sigma_{\vec{S}_i}$, $V_i$ is the Cholesky decomposition of $\Sigma_v$ (which is just the inverse square root because $\Sigma_v$ is a scalar), and $I_{3\times 3}$ is the identity matrix. This single-sample Jacobian represents the constraint:

$$\left\| \begin{bmatrix} \vec{F} & I_{3\times 3} & S_i \\ 1 & 0 & \bar{v} \end{bmatrix} \begin{bmatrix} v_i \\ \vec{W} \\ -1 \end{bmatrix} \right\|^2_{\Sigma_{\vec{S}_i}}, \quad [4]$$

which is identical to a single summand in the optimization represented in equation [2], but rewritten using a single Jacobian matrix. It may be noted that the first column of $\overline{A}_i$ corresponds to the airspeed magnitude scalar, the next three columns correspond to the wind vector, and the last column is the right-hand-side vector.

As a next step in marginalizing out the unknown airspeed $v_i$, a QR decomposition of the single-constraint Jacobian $\overline{A}_i$ is formed:

$$\overline{A}_i = Q\overline{R}_i. \quad [5]$$

A component of $\overline{R}_i$ corresponding to the marginal constraint on the wind W can be then be identified by noting that $\overline{R}_i$ represents exactly the same constraint as $\overline{A}_i$ (this being a property or QR). Thus:

$$\left\| \overline{R}_i \begin{bmatrix} v_i \\ \vec{W} \\ -1 \end{bmatrix} \right\|^2 = \left\| \overline{A}_i \begin{bmatrix} v_i \\ \vec{W} \\ -1 \end{bmatrix} \right\|^2. \quad [6]$$

$\overline{R}_i$ can be split into blocks corresponding to each variable as:

$$\overline{R}_i \begin{bmatrix} v_i \\ \vec{W} \\ -1 \end{bmatrix} = \begin{bmatrix} R_{ivv} & R_{iv\vec{W}} & d_{iv} \\ 0 & R_{i\vec{W}\vec{W}} & d_{i\vec{W}} \end{bmatrix} \begin{bmatrix} v_i \\ \vec{W} \\ -1 \end{bmatrix}. \quad [7]$$

In equation [7], $R_{i\vec{W}\vec{W}} \in \mathbb{R}^{2\times 3}$ and $d_{i\vec{W}} \in \mathbb{R}^2$ form the marginal constraint on the wind $\vec{W}$ that can then be applied to complete the formulation.

The full 2n×3 wind Jacobian can then be obtained by stacking all the 2×3 single-constraint marginal Jacobians $R_{i\vec{W}\vec{W}}$ and their right-hand-side vectors $d_{i\vec{W}}$:

$$A_{\vec{W}} = \begin{bmatrix} R_{1\vec{W}\vec{W}} \\ \vdots \\ R_{n\vec{W}\vec{W}} \end{bmatrix}, \quad b_{\vec{W}} = \begin{bmatrix} d_{1\vec{W}\vec{W}} \\ \vdots \\ d_{n\vec{W}\vec{W}} \end{bmatrix}. \quad [8]$$

Finally, the wind can be calculated by solving the least-squares system represented by the Jacobian using another QR decomposition followed by back-substitution. The result may be expressed as:

$$A_{\vec{W}} = Q_{\vec{W}} R_{\vec{W}}, \text{ and} \quad [9a]$$

$$\vec{W} = R_{\vec{W}}^{-1} A_{\vec{W}}^T b_{\vec{W}}. \quad [9b]$$

The covariance on the wind estimate can then be obtained as:

$$\Sigma_{\vec{W}} = (R_{\vec{W}}^T R_{\vec{W}})^{-1}. \quad [10]$$

In accordance with example embodiments, the kinematic estimation of wind as derived analytically in equations [2]-[10] above can be implemented computationally on a processor or other computing platform of an aerial vehicle during flight. In particular, the aerial vehicle can compute the wind using only measurements of ground speed and orientation, without the need for direct airspeed measurements. Further, the formulation that emerges from the above derivation lends itself to fast and efficient computation of wind by the type and scale of computing system that, for practical and design considerations, may be used on a UAV or other similar type of vehicle. Also in accordance with example embodiments, the optimization used in kinematic wind estimation technique is carried out over all the n sample pairs, without applying any filters.

Figure 6:
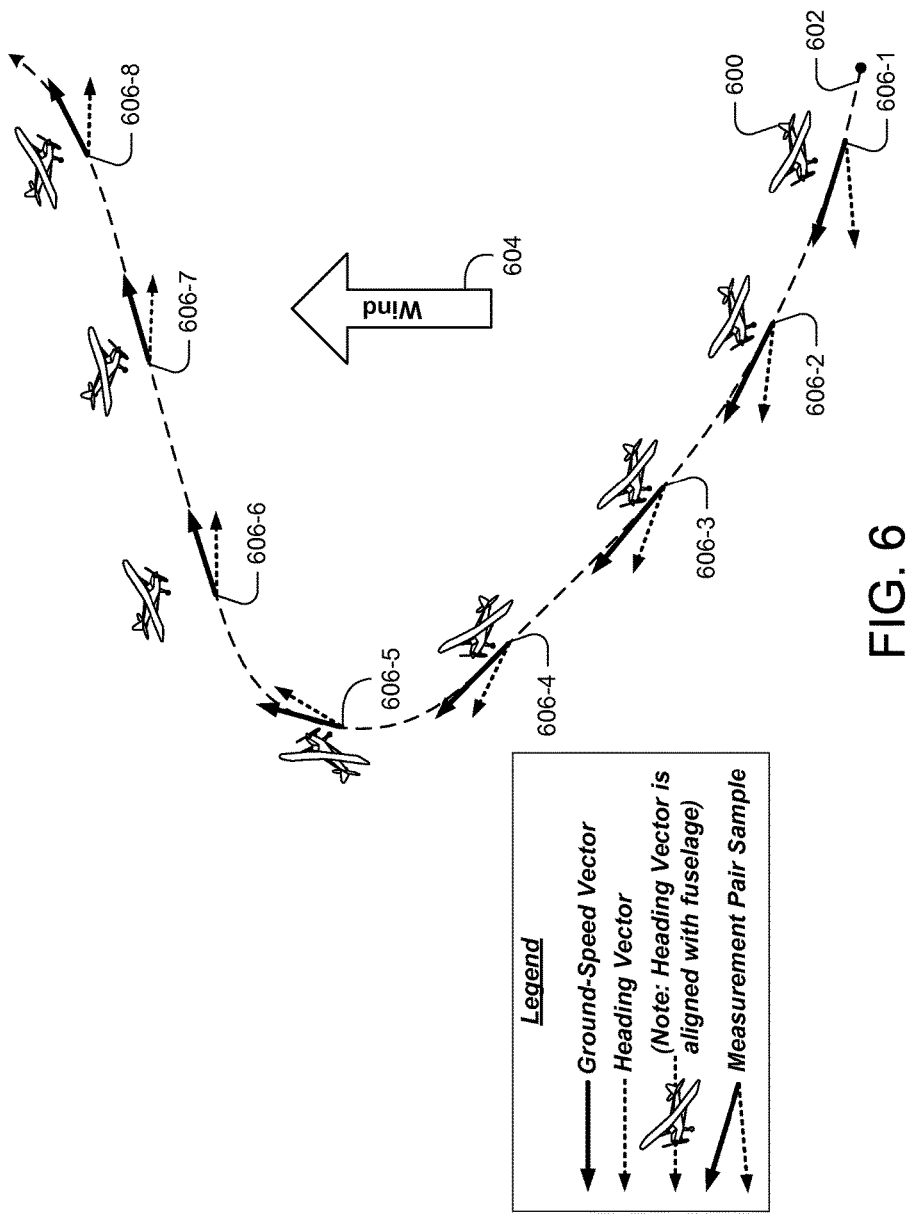
FIG. 6 is a conceptual illustration of a relation between wind and certain flight kinematics of an airborne vehicle, according to an example embodiment.

FIG. 6 is a conceptual illustration of a relation between wind and flight kinematics of an airborne vehicle, according to an example embodiment. In the illustration, an airborne vehicle 600 is represented as flying along a flight path 602, shown as curved dashed arrow spanning FIG. 6 from bottom to top. A wind vector 604 indicates the direction and magnitude of the wind during flight; the particular direction and magnitude are taken by way of example. At any given point along the flight path 602, the airborne vehicle 600 will have a flight-heading vector and a ground-speed vector. The flight-heading vector corresponds to a forward-pointing direction of the vehicle, while ground-speed vector corresponds to the vehicle's velocity vector with respect to the ground-based coordinate system. As described in connection with equation [2] above, for example, the flight-heading vector can be taken to be a unit vector aligned with a forward pointing direction of the fuselage of the vehicle.

In accordance with example embodiments, the airborne vehicle 600 can measure both its ground-speed vector and heading vector at a multiplicity of sampling times during its flight. The two vector measurements acquired at each sample time can be considered to constitute a measurement pair sample. The sampling times could be periodic, though they need not necessarily be so. By way of example, FIG. 6 depicts eight measurement pair samples 606-1, 606-2, 606-3, 606-4, 606-5, 606-6, 606-7, and 606-8 at each of eight points along the flight path 602. It will be appreciated that there could be more or fewer samples. Each ground-speed vector is represented as a short, black, solid arrow, and each flight-heading vector is represented as a short, black, dashed arrow. As depicted, the directions and magnitudes of both types of arrows may be taken as representative, and not necessarily intended to be precise (as a unit vector, the magnitude of illustrated flight-heading vectors may be considered arbitrary). A legend in FIG. 6 serves as a graphical explanation of the two types of vectors and of measurement pair samples. As noted, the flight-heading vector is aligned with the fuselage of the airborne vehicle 600.

The measurement pair samples 606-1, 606-2, 606-3, 606-4, 606-5, 606-6, 606-7, and 606-8 are examples of the types of measurements used in the kinematic estimation technique described above. More specifically, the flight-heading vector of each given sample can be taken to correspond to the unit vector $\vec{F}_1$ in equation [2] and following, and the ground-speed vector of each given sample can be taken to correspond to the ground-speed vector $S_i$ in equation [2] and following. Note that all the other quantities are either derived from $\vec{F}_i$ and $S_i$ or determined by carrying out the various steps represented in the equations [2]-[10]. In accordance with example embodiments, the wind estimate can be obtained by solving the optimization problem posed in equation [2]. While the example illustration in FIG. 6 depicts only eight measurement pair samples, it is contemplated that application of the kinematic estimation technique would more likely include a large multiplicity of measurement pair samples collected at regular sampling intervals over a period of time for which wind estimation is sought. As an example, a few to several (e.g., 2-10) hundreds of measurement pair samples can be acquired at a sampling interval of 5 seconds (i.e., one sample every 5 seconds). Other multiplicities and/or sampling intervals can be used as well.

2. Model-Based Estimation

The model-based estimation technique uses an analytical aerodynamic model of an aerial vehicle to calculate predicted physical forces on the vehicle during flight, while iteratively adjusting a wind hypothesis applied to the model calculation so as to minimize a difference between the predicted physical forces and measured physical forces. The analytical aerodynamic model provides a mathematical description of flight dynamics of the aerial vehicle. It includes various parameters that specify physical properties and characteristics of the aerial vehicle, and various coefficients of dynamic physical variables that apply to the vehicle during flight. The parameters generally remain static during flight. The coefficients can be mapped out over a wide range of flight conditions through testing. The model also includes various real-time state variables, such as actuator settings, applied thrust, and control-surface settings, among others. A wind hypothesis can be applied to the calculation by including a parameterized description of wind in the model. For a given setting of the real-time state variables during a given interval of time, adjusting the parameters of the wind hypothesis can correspondingly alter the predicted physical forces calculated by the model.

Some examples of parameters of the model could include vehicle physical dimensions, such as wingspan, length, reference area, the vehicle's weight, and ranges of motion of control surfaces. Values and/or ranges of values of the parameters can be set, for example, as part of design and construction of the aerial vehicle.

Model coefficients include coefficients of force and moments. More specifically, during flight, an aerial vehicle will experience a linear vector force F with components $F_x$, $F_y$, and $F_z$ in the x, y, and z directions, respectively. Here, x, y, and z form a rectangular coordinate system in the reference frame of the aerial vehicle, defined according to conventions known in the art. The linear vector force can be expressed as:

$$F = C_F Q S_{ref}, \quad [11]$$

where $$Q = \left(\frac{1}{2}\right)\rho v^2$$

is the dynamic pressure, $S_{ref}$ is the reference area of the wing, and $C_F$ is a vector of dimensionless force coefficients in the frame of reference of the vehicle:

$$C_F = \begin{bmatrix} R_2(\alpha) \begin{bmatrix} C_L \\ C_D \end{bmatrix} \\ C_Y \end{bmatrix} = \begin{bmatrix} C_L \sin\alpha - C_D \cos\alpha \\ C_L \cos\alpha + C_D \sin\alpha \\ C_Y \end{bmatrix}. \quad [12]$$

In equation [12], $C_L$, $C_D$, and $C_Y$ are dimensionless coefficients of lift, drag, and linear force in the y-direction ($F_y$), respectively, and $\alpha$ is the angle of attack. The coefficients of lift and drag can be expressed in terms of dimensionless coefficients of linear force in the x and z directions according to the relations:

$$C_L = -C_Z \cos\alpha + C_X \sin\alpha, \text{ and} \quad [13a]$$

$$C_D = -C_Z \sin\alpha - C_X \cos\alpha, \quad [13b]$$

where $C_X$ and $C_Z$ are the dimensionless coefficients $F_x$ and $F_z$, respectively.

In a similar manner, the net moment vector M can be expressed as:

$$M = C'_M Q S_{ref}, \quad [14]$$

where $C'_M$ is a vector of dimensionless moment coefficients in the frame of reference of the vehicle:

$$C'_M = \begin{bmatrix} C_l l_{span} \\ C_m l_{chord} \\ C_n l_{span} \end{bmatrix}. \quad [15]$$

In equation [14], $C_l$, $C_m$, and $C_n$ are dimensionless coefficients of moments about the axes of roll, pitch, and yaw, respectively, $l_{span}$ is the reference wingspan, and $l_{chord}$ is the reference vehicle length (e.g., nose-to-tail).

The six dimensionless coefficients of equations [12] and [15] plus their respective time derivatives, together with the various parameters of the model can specify a mathematical framework for predicting expected forces on the aerial vehicle under flight conditions, given the settings of the vehicle's real-time state variables and a wind vector. In order to determine values for the six dimensionless coefficients, the vehicle can be flight-tested under controlled conditions in which the wind vector is known, such as in a wind tunnel. By measuring in this environment the forces on the vehicle for a large array of vehicle orientations (e.g., roll, pitch, and yaw) and for a range of settings of state variables, values of the six dimensionless coefficients can effectively be mapped out. This technique for determining force and moment coefficients of an aerial vehicle is sometimes referred to as "coefficient build-up."

When invoked in real-time, the aerodynamic model can thus be used to calculate predicted forces on the aerial vehicle for a given input of state variable settings and assumed wind (wind hypothesis). As such, one use for the model is as a simulator, whereby the simulation results are the predicted forces (among possibly other outputs). In the context of the model estimation technique for determining wind during actual flight, when actual forces on the vehicle can be measured, the aerodynamic model can be integrated into an analytical framework for minimizing differences between the measured forces and those predicted by the model. In accordance with example embodiments, in this a framework the wind hypothesis supplies adjustable parameters whose optimal values can be determined through the minimization procedure. The resulting minimization then yields a best estimate of the wind incident on the vehicle at the vehicle's location during flight.

Figure 7:
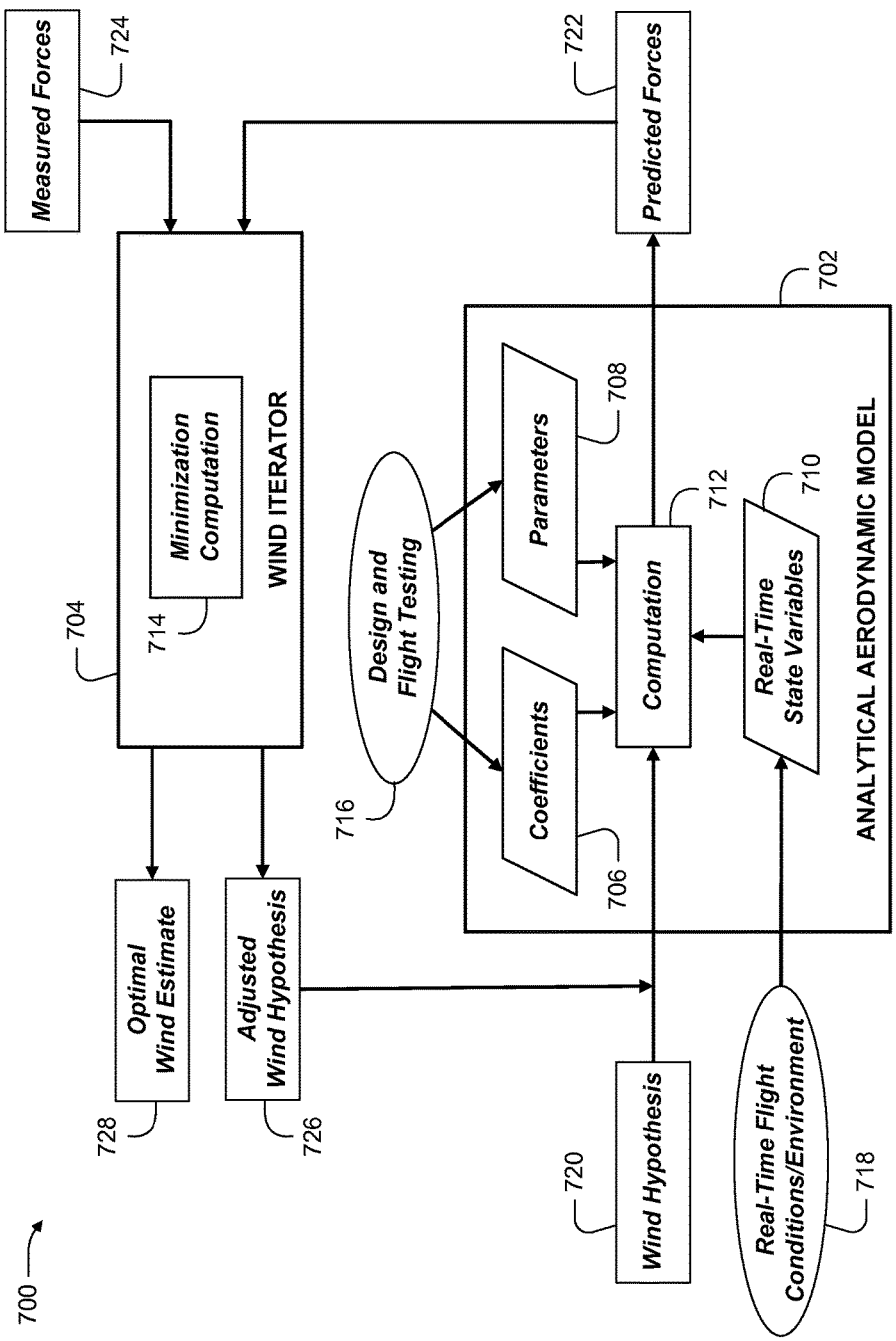
FIG. 7 is a simplified block diagram of a system for estimating wind, according to an example embodiment.

FIG. 7 is a simplified block diagram of a system 700 for implementing the model estimation technique for estimating wind, according to an example embodiment. The system 700 includes two high-level computational components and conceptually illustrates process flow that achieves the minimization and yields the wind estimate. The two computational components shown are an analytical aerodynamic model 702 and a wind iterator 704. In accordance with example embodiments, each could be implemented as machine-readable instructions executable by the one or more processors of a computing system of an aerial vehicle, such as UAVs 100, 200, 300, or 350. Each could further include various data components. The machine-language instructions could be stored in one or another form of a tangible, non-transitory computer-readable medium (or other article of manufacture), such as magnetic or optical disk, or the like, and made available to processing elements of the system as part of a manufacturing procedure, configuration procedure, and/or execution start-up procedure, for example.

The analytical aerodynamic model 702 includes coefficients 706, parameters 708, and real-time state variables 710, and a computation module 712 that carries out the calculations that yield predicted forces 722. The coefficients 706 can include the dimensionless coefficients of equations [12] and [15] plus their respective time derivatives, and the parameters can similarly include the parameters described above. Values of the parameters 708 can be determined during design and construction of the vehicle; and values of the coefficients can determine by way of a coefficient build-up procedure, or other suitable approach. Values of the real-time state variables 710 can be set at particular instances during flight according to actual settings represented in the real-time flight conditions/environment 718.

As shown, the wind iterator 704 includes a minimization computation module 714 that carries out an analytical minimization procedure, such as one describe below. In accordance with example embodiments, the minimization computation iteratively adjusts the parameters of the wind hypothesis in order to minimize the difference between the predicted forces 722 and the measured forces 724. More specifically, the wind iterator 704 can invoke the analytical aerodynamic model 702 in successive iterations in order to generate successive iterations of predicted forces 722. The iterations can begin with an initial wind hypothesis 720. For each subsequent iteration, the wind parameters are adjusted in order to reduce deviations between the predicted forces 722 and the measured forces 724. The adjusted wind parameters, represented as the adjusted wind hypothesis 726 in FIG. 7, are then input to the analytical aerodynamic model 702 in order to generate the next iteration of the predicted forces 722, which are then input to a next iteration of minimization. The iterations are repeated until the deviations between the predicted forces 722 and the measured forces 724 are reduced below an acceptability threshold or within a specified confidence limit.

In an example embodiment, the minimization computation 714 can be implemented using a Levenberg-Marquardt algorithm for least-squares minimization of deviations between non-linear analytical functions and observed data. More particularly, in the Levenberg-Marquardt algorithm, a set of m empirical data pairs of independent and dependent variables $(x_i, y_i)$ are fit with a model curve $f(x, \beta)$ by determining an optimal set of parameters $\beta$ that minimizes the sum of the squares of the deviations between $y_i$ and $f(x_i, \beta)$ over all m pairs. The dependent variables $y=\{y\}$, i=1, . . . , m, can considered observed or measured data. The problem can be formulated as minimizing the sum $S(\beta)$, where:

$$S(\beta) = \Sigma_{i=1}^{m}[y_i - f(x_i, \beta)]^2. \quad [16]$$

The minimization of $S(\beta)$ is carried out iteratively, beginning with an initial set of parameters $\beta$, and adjusting $\beta$ on each subsequent iteration to reduce $S(\beta)$. At each iteration, $\beta$ is updated to $\beta + \delta$, and then $\delta$ is determined such that $S(\beta)$ decreases. For small $\delta$, the sum of the squares can be approximated as:

$$S(\beta+\delta) \approx \Sigma_{i=1}^{m}[y_i - f(x_i, \beta) - J_i\delta]^2, \quad [7]$$

where:

$$J_i = \frac{\partial f(x_i, \beta)}{\partial \beta}. \quad [18]$$

At the minimum of $S(\beta)$, the gradient of $S(\beta)$ with respect to $\delta$ will be zero. Setting the derivative of equation [17] with respect to d zero, and expressing the result in vector form gives:

$$(J^T J)\delta = J^T[y - f(\beta)], \quad [19]$$

where J is the Jacobian matrix. The left hand side of equation [19] can be modified to incorporate the adjustment $\delta$ to $\beta$ on each iteration, leading to the formulation:

$$(J^T J + \lambda \text{diag}(J^T J))\delta = J^T[y - f(\beta)], \quad [20]$$

where $\lambda$ is a damping factor that is adjusted on each iteration. Including $\lambda$ accommodates how rapidly $S(\beta)$ decreases on each interation; scaling $\lambda$ by the diagonal elements of $J^TJ$ speeds up convergence along directions where the gradient of $S(\beta)$ is small.

The minimization of the Levenberg-Marquardt algorithm can be applied to the model-based estimation technique for determining wind by taking the measured forces 722 to be the observed data $y=\{y_i\}$, and taking the value of the curve $f(x_i, \beta)$ to be the predicted forces 724. Determining the predicted forces 724 for each iteration then entails computing $f(x_i, \beta)$ according to the analytical aerodynamic model 702 based on the current iteration of the wind hypothesis as expressed in the parameters $\beta$. The optimal values for $\beta$, and therefore the best wind estimate, are obtained by the minimization expressed in equation [20].

In accordance with example embodiments, the predicted forces 722 and measured forces 724 can be linear acceleration, for example in the x, y, and z directions. Linear acceleration can be related to the force and moment coefficients discussed above. Measurements of linear acceleration can be obtained by an inertial measurement unit, for example. It will be appreciated that the model-based estimation technique can used other variables of dynamic forces as well. The minimization can be carried out over data obtained at individual time steps, or data obtained over multiple time steps. Further, the calculation can be performed in real-time, as measurements are obtained, so that the model-based wind estimates are determined nearly concurrently with measurements of forces on the airborne aerial vehicle. It will also be appreciated that the model-based estimate technique can be adapted to use other algorithms of least-squares minimization besides the Levenberg-Marquardt algorithm.

VI. Illustrative Methods

Figure 8:
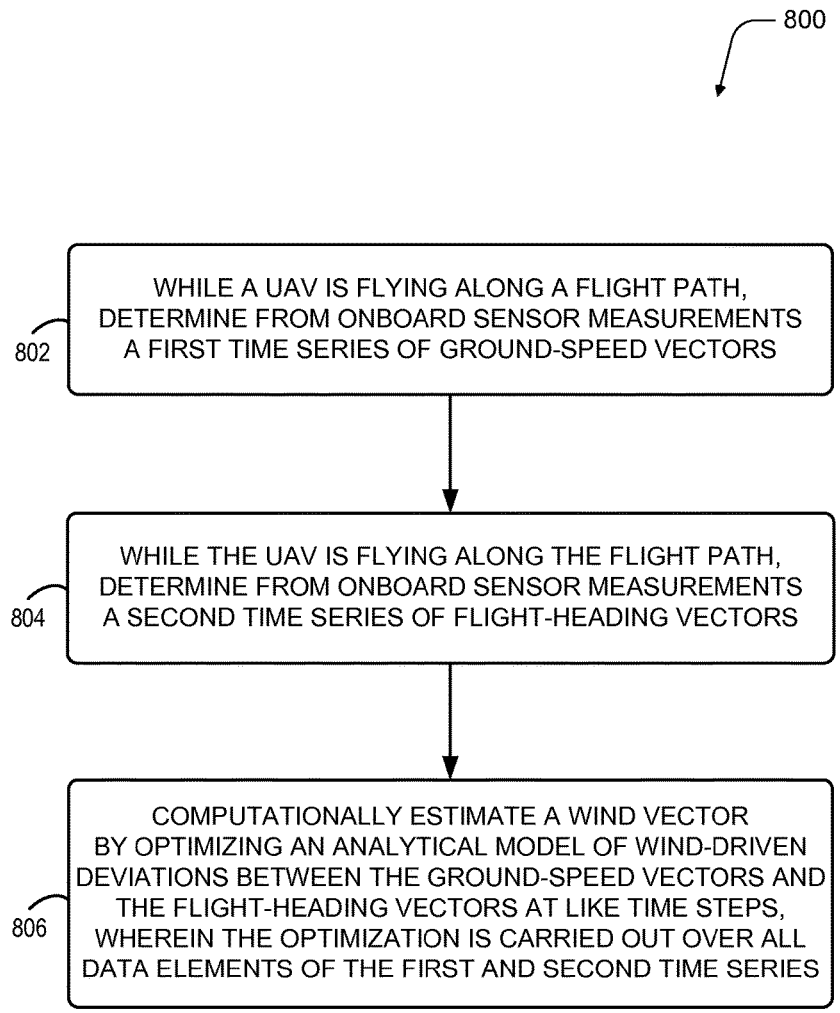
FIG. 8 is a flow chart illustrating an example method 800, according to an example embodiment.
Figure 9:
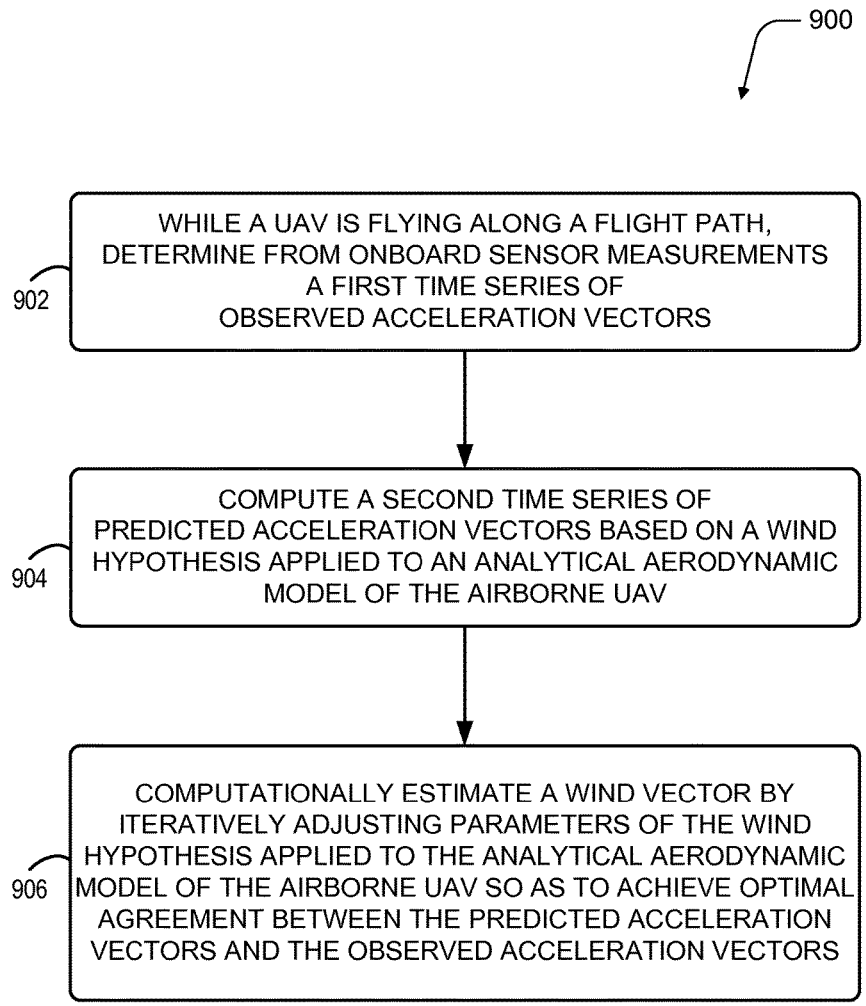
FIG. 9 is a flow chart illustrating an example method 900, according to an example embodiment.

In accordance with example embodiments, the kinematic wind estimation technique and the model-based wind estimation technique can each be implemented as a computer-based method. Each method could be implemented as machine-readable instructions executable by the one or more processors of a computing system of an aerial vehicle. The machine-readable instructions could be stored in one or another form of a tangible, non-transitory computer-readable medium (or other article of manufacture), such as magnetic or optical disk, or the like, and made available to processing elements of the system as part of a manufacturing procedure, configuration procedure, and/or execution start-up procedure, for example. FIG. 8 is a flow chart illustrating an example method 800 of kinematic wind estimation, according to an example embodiment, and FIG. 9 is a flow chart illustrating an example method 900 of model-based wind estimation.

The flow charts for each of example methods 800 and 900 show functionality and operation of one possible implementation in accordance with example embodiments. In this regard, each block in FIGS. 8 and 9 may represent a module, a segment, or a portion of program code, which includes one or more instructions executable by a processor for implementing specific logical functions or operations in the process. Moreover, each block may represent circuitry that is wired to perform the specific logical functions or operations in the process. It should be understood that the operations of methods 800 and 900 may be performed as discussed above.

As shown by block 802, the method 800 involves a UAV determining from onboard sensor measurements a first time series of ground-speed vectors with respect to a ground-based coordinate system, the first time series having a set of time steps. More particularly, the determination of the first time series is made while the UAV is airborne and flying along a flight path.

As shown by block 804, the method 800 involves the UAV determining from onboard sensor measurements a second time series of flight-heading vectors with respect to the ground-based coordinate system, the second time series having the same set of time steps as the first time series. Again, the determination of the second time series is made while the UAV is airborne and flying along a flight path.

Finally, as shown by block 806, the method 800 involves a processor of the UAV computationally estimating a wind vector with respect to the ground-based coordinate system by optimizing an analytical model of wind-driven deviations between the ground-speed vectors and the flight-heading vectors at like time steps, the optimization being carried out over all data elements of the first and second time series. The computation is carried out while the UAV is airborne.

In accordance with example embodiments, the sensors used for determining both the first time series of ground-speed vectors and the second time series of flight-heading vectors can be one or both of an inertial measurement unit (IMU) and a Global Positioning Satellite (GPS) system receiver. Other types of sensors onboard the UAV could be used as well.

Also in accordance with example embodiments, each ground-speed vector can be a velocity vector of the UAV measured at each corresponding time step, and each can be defined in by three orthogonal components measured with respect to the ground-based coordinate system. Similarly, each flight-heading can be a unit vector aligned with the airborne UAV's forward-pointing direction and determined at each corresponding time step. Each flight-heading vector can be defined by three orthogonal components measured with respect to the ground-based coordinate system.

In further accordance with example embodiments, the analytical model of wind-driven deviations between the ground-speed vectors and the flight-heading vectors can be formulated in terms of a vector deviation at each respective time step between the ground-speed vector at the respective time step and a sum of (i) a scale factor multiplied by the flight-heading vector at the respective time step plus (ii) a wind hypothesis. In this formulation, optimizing the analytical model can entail determining a wind hypothesis that minimizes a sum of the vector deviation over all the time steps. More particularly, the scale factor can be an airspeed estimate at each time step. As such the multiplicative product of the airspeed with the flight-heading vector at each time step will correspond to an estimate of an airspeed vector at each time step. With this configuration of terms, optimizing the analytical model can entail algebraically formulating the analytical model to marginalize out the airspeed estimate at all of the time steps over which the optimization is performed. In addition, the analytical model further include a cost function that accounts for a deviation between a nominal expected air speed airspeed and an airspeed estimate at each time step.

In still further accordance with example embodiments, the method 800 can further include adjusting at least one aspect of a flight-control function of the airborne UAV based at least in part on the computationally-estimated wind vector. For example, it may be determined from the computationally-estimated wind vector that a particular airborne maneuver cannot be safely and/or successfully executed. In this case, the UAV may refrain from carrying out an airborne maneuver on the basis of the computationally-estimated wind vector.

Turning now to FIG. 9, as shown by block 902, the method 900 involves a UAV determining from onboard sensor measurements a first time series of observed acceleration vectors, the first time series having a set of time steps. More particularly, the determination of the first time series is made while the UAV is airborne and flying along a flight path.

As shown by block 904, the method 900 involves a processor of the UAV computing a second time series of predicted acceleration vectors based on a wind hypothesis applied to an analytical aerodynamic model of the airborne UAV. The second time series has the same set of time steps as the first time series, and it is computed while the UAV is airborne.

Finally, as shown by block 906, the method 900 involves, a processor of the UAV computationally estimating a wind vector with respect to a ground-based coordinate system by iteratively adjusting parameters of the wind hypothesis applied to the analytical aerodynamic model of the airborne UAV so as to achieve optimal agreement between the predicted acceleration vectors and the observed acceleration vectors. Again, the computation is carried out while the UAV is airborne.

In accordance with example embodiments, the sensors used for determining first time series of observed acceleration vectors can be one or both of an inertial measurement unit (IMU) and a Global Positioning Satellite (GPS) system receiver. Other types of sensors onboard the UAV could be used as well.

Also in accordance with example embodiments, each acceleration vector can be defined by three orthogonal components at each corresponding time step with respect to the ground-based coordinate system. Similarly, each predicted acceleration vector can be defined by three orthogonal components at each corresponding time step with respect to the ground-based coordinate system.

In accordance with example embodiments, the analytical aerodynamic model of the airborne UAV can be configured for computing acceleration of the airborne UAV based on (i) settings of coefficients of the aerodynamic model, (ii) real-time settings of UAV state variables, and (iii) settings of the parameters of the hypothesized wind vector applied to the aerodynamic model. More particularly, the settings of the coefficients of the aerodynamic model can be determined based on one or more previous, controlled test-flights of the UAV. Further, the UAV state variables can include one or more state variables of one or more flight-control functions. As such, the real-time settings of the real-time UAV state variables can determined during flight of the airborne UAV along the flight path.

Also in accordance with example embodiments, iteratively adjusting the parameters of the wind hypothesis to achieve optimal agreement between the predicted acceleration vectors and the observed acceleration vectors can entail iteratively computing the second time series of predicted acceleration vectors, and for each iteration, computing a least-squares minimization of a difference between the predicted acceleration vectors and the observed acceleration vectors. Then, based on the computed least-squares minimization during each iteration, adjusting the parameters of the wind hypothesis in preparation for application of wind hypothesis on a next iteration.

In still further accordance with example embodiments, the method 900 can further include adjusting at least one aspect of a flight-control function of the airborne UAV based at least in part on the computationally-estimated wind vector. For example, it may be determined from the computationally-estimated wind vector that a particular airborne maneuver cannot be safely and/or successfully executed. In this case, the UAV may refrain from carrying out an airborne maneuver on the basis of the computationally-estimated wind vector.

It will be appreciated that the steps shown in FIGS. 8 and 9 are meant to illustrate example methods in accordance with example embodiments. As such, various steps could be altered or modified, the ordering of certain steps could be changed, and additional steps could be added, while still achieving the overall desired operation.

VII. Conclusion

While various aspects and embodiments have been disclosed herein, other aspects and embodiments will be apparent to those skilled in the art. The various aspects and embodiments disclosed herein are for purposes of illustration and are not intended to be limiting, with the true scope being indicated by the following claims, along with the full scope of equivalents to which such claims are entitled. It is also to be understood that the terminology used herein is for the purpose of describing particular embodiments only, and is not intended to be limiting.

We claim:
1. An unmanned aerial vehicle (UAV) comprising:
a network interface;
one or more sensors;
one or more processors; and
a computer-readable medium having stored therein instructions that are executable by the one or more processors to cause the UAV to carry out operations including:
while flying along a flight path, determining from onboard sensor measurements a first time series of ground-speed vectors with respect to a ground-based coordinate system, wherein the first time series has a set of time steps,
while flying along the flight path, determining from onboard sensor measurements a second time series of flight-heading vectors with respect to the ground-based coordinate system, wherein the second time series has the same set of time steps as the first time series, and
computationally estimating a wind vector with respect to the ground-based coordinate system by optimizing an analytical model of wind-driven deviations between the ground-speed vectors and the flight-heading vectors at like time steps, wherein the optimization is carried out over all data elements of the first and second time series,
wherein each ground-speed vector comprises three orthogonal components of the airborne UAV's velocity vector at each corresponding time step with respect to the ground-based coordinate system,
wherein each flight-heading is a unit vector comprising three orthogonal components of the airborne UAV's forward-pointing direction at each corresponding time step with respect to the ground-based coordinate system,
wherein the analytical model of wind-driven deviations between the ground-speed vectors and the flight-heading vectors at like time steps comprises a vector deviation at each respective time step between the ground-speed vector at the respective time step and a sum of (i) a scale factor multiplied by the flight-heading vector at the respective time step plus (ii) a wind hypothesis, and wherein optimizing the analytical model comprises determining a wind hypothesis that minimizes a sum of the vector deviation over all the time steps.

2. The UAV of claim 1, wherein the one or more sensors are at least one of an inertial measurement unit (IMU), or a Global Positioning Satellite (GPS) system receiver.

3. The UAV of claim 1, wherein the scale factor is an airspeed estimate at each time step, and the airspeed estimate multiplied by the flight-heading vector at each time step corresponds to an estimate of an airspeed vector at each time step, and wherein optimizing the analytical model further comprises algebraically formulating the analytical model to marginalize out the airspeed estimate at all of the time steps over which the optimization is performed.

4. The UAV of claim 1, wherein the operations further include, based at least in part on the computationally-estimated wind vector, adjusting at least one aspect of a flight-control function of the UAV while flying along the flight path.

5. The UAV of claim 4, wherein adjusting the at least one aspect of the flight-control function of the airborne UAV base at least in part on the computationally-estimated wind vector comprises refraining from carrying out an airborne maneuver.

6. An unmanned aerial vehicle (UAV) comprising:
a network interface;
one or more sensors;
one or more processors; and
a computer-readable medium having stored therein instructions that are executable by the one or more processors to cause the UAV to carry out operations including:
while flying along a flight path, determining from onboard sensor measurements a first time series of observed acceleration vectors, wherein the first time series has a set of time steps,
computing a second time series of predicted acceleration vectors based on a wind hypothesis applied to an analytical aerodynamic model of the UAV, wherein the second time series has the same set of time steps as the first time series, and
computationally estimating a wind vector with respect to a ground-based coordinate system by iteratively adjusting parameters of the wind hypothesis applied to the analytical aerodynamic model of the UAV so as to achieve optimal agreement between the predicted acceleration vectors and the observed acceleration vectors according to a least-squares minimization of deviations between the predicted acceleration vectors and the observed acceleration vectors.

7. The UAV of claim 6, wherein the one or more sensors are at least one of an inertial measurement unit (IMU), or a Global Positioning Satellite (GPS) system receiver.

8. The UAV of claim 6, wherein the analytical aerodynamic model of the UAV is configured for computing acceleration of the UAV based at least on (i) settings of coefficients of the aerodynamic model, (ii) real-time settings of UAV state variables, and (iii) settings of the parameters of the hypothesized wind vector applied to the aerodynamic model, wherein the settings of the coefficients of the aerodynamic model are determined based on one or more previous, controlled test-flights of the UAV, and wherein the UAV state variables comprise one or more state variables of one or more flight-control functions, and the real-time settings of the real-time UAV state variables are determined during flight of the UAV along the flight path.

9. The UAV of claim 6, wherein iteratively adjusting the parameters of the wind hypothesis applied to the analytical aerodynamic model of the UAV so as to achieve optimal agreement between the predicted acceleration vectors and the observed acceleration vectors according to a least-squares minimization of deviations between the predicted acceleration vectors and the observed acceleration vectors comprises:

iteratively computing the second time series of predicted acceleration vectors;

during each iteration, computing a least-squares minimization of a difference between the predicted acceleration vectors and the observed acceleration vectors; and based on the computed least-squares minimization during each iteration, adjusting the parameters of the wind hypothesis in preparation for application of wind hypothesis on a next iteration.

10. The UAV of claim 6, wherein the operations further include, based at least in part on the computationally-estimated wind vector, adjusting at least one aspect of a flight-control function of the UAV while flying along the flight path.

11. The UAV of claim 10, wherein adjusting the at least one aspect of the flight-control function of the airborne UAV base at least in part on the computationally-estimated wind vector comprises refraining from carrying out an airborne maneuver.

12. The UAV of claim 3, wherein the analytical model further comprises a cost function that accounts for a deviation between a nominal expected air speed airspeed and an airspeed estimate at each time step.

* * * * *